United States Patent
Ivanov et al.

(10) Patent No.: US 12,489,546 B2
(45) Date of Patent: Dec. 2, 2025

(54) MODULATION SCHEMES FOR NONBINARY POLAR CODING

(71) Applicant: QUALCOMM Incorporated, San Diego, CA (US)

(72) Inventors: Kirill Ivanov, La Jolla, CA (US); Wei Yang, San Diego, CA (US); Pinar Sen, San Diego, CA (US); Thomas Joseph Richardson, South Orange, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 3 days.

(21) Appl. No.: 18/596,006

(22) Filed: Mar. 5, 2024

(65) Prior Publication Data
US 2025/0286647 A1    Sep. 11, 2025

(51) Int. Cl.
*H04L 1/00* (2006.01)
*H03M 13/00* (2006.01)
*H03M 13/13* (2006.01)

(52) U.S. Cl.
CPC .......... *H04L 1/0003* (2013.01); *H03M 13/13* (2013.01); *H04L 1/0057* (2013.01)

(58) Field of Classification Search
CPC ..... H04L 1/0003; H04L 1/0057; H03M 13/13
See application file for complete search history.

(56) References Cited

U.S. PATENT DOCUMENTS

| | | | |
|---|---|---|---|
| 9,143,267 B2 * | 9/2015 | Ma | H03M 13/35 |
| 10,313,056 B2 * | 6/2019 | Koike-Akino | H03M 13/3961 |
| 10,728,080 B2 * | 7/2020 | Sankar | H04L 27/36 |
| 12,107,605 B1 * | 10/2024 | Farsiabi | H03M 13/1171 |
| 12,273,200 B2 * | 4/2025 | Savin | H04L 1/0003 |

* cited by examiner

*Primary Examiner* — Justin R Knapp
(74) *Attorney, Agent, or Firm* — Holland & Hart LLP

(57) ABSTRACT

Methods, systems, and devices for wireless communications are described. The described techniques relate to improved methods, systems, devices, and apparatuses that support modulation schemes for nonbinary polar coding. For example, the described techniques may enable a transmitting device to perform a modulation of a set of symbols (e.g., bit pairs) that are encoded using a nonbinary polar encoding scheme. For example, the transmitting device may map each symbol of a set of encoded symbols to a constellation point. Additionally, or alternatively, the transmitting device may convert the encoded symbols into strings of bits. The transmitting device may accordingly perform bit-to-constellation mapping of the resulting bitstring using an existing mapping scheme or by defining a new mapping scheme. A receiving device may demodulate a received message by performing a demodulation of the set of modulated symbols or bits (e.g., and by converting the bitstring into the set of information symbols).

20 Claims, 14 Drawing Sheets

MODULATION SCHEMES FOR NONBINARY POLAR CODING

FIELD OF TECHNOLOGY

The following relates to wireless communications, including modulation schemes for nonbinary polar coding.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support modulation schemes for nonbinary polar coding. For example, the described techniques enable a transmitting device to perform a modulation of a set of symbols (e.g., bit pairs) that are encoded using a nonbinary polar encoding scheme. For example, the transmitting device may map each symbol of a set of encoded symbols to a constellation point. Additionally, or alternatively, the transmitting device may convert the encoded symbols into strings of bits. The transmitting device may accordingly perform bit-to-constellation mapping of the resulting bitstring using an a mapping scheme, which may be a new mapping scheme defined for nonbinary polar coding and mapping, as described herein. After transmitting the mapped bitstring, a receiving device may demodulate the received message by performing a demodulation of the set of modulated symbols or bits (e.g., by converting the bitstring into the set of information symbols).

A method for wireless communications by a wireless device is described. The method may include inputting one or more information symbols of a set of information symbols into one or more respective channels of a polar encoder to obtain a set of encoded information symbols, where a respective information symbol input into a respective channel includes at least two information bits, and where a respective encoded information symbol obtained from the polar encoder includes at least two encoded information bits, performing a mapping procedure on the set of encoded information symbols, where the mapping procedure maps the set of encoded information symbols to one or more constellation points associated with a modulation scheme for transmission of the set of encoded information symbols to obtain a mapped set of encoded information symbols, and transmitting a message including the mapped set of encoded information symbols.

A wireless device for wireless communications is described. The wireless device may include one or more memories storing processor executable code, and one or more processors coupled with the one or more memories. The one or more processors may individually or collectively be operable to execute the code to cause the wireless device to input one or more information symbols of a set of information symbols into one or more respective channels of a polar encoder to obtain a set of encoded information symbols, where a respective information symbol input into a respective channel includes at least two information bits, and where a respective encoded information symbol obtained from the polar encoder includes at least two encoded information bits, perform a mapping procedure on the set of encoded information symbols, where the mapping procedure maps the set of encoded information symbols to one or more constellation points associated with a modulation scheme for transmission of the set of encoded information symbols to obtain a mapped set of encoded information symbols, and transmit a message including the mapped set of encoded information symbols.

Another wireless device for wireless communications is described. The wireless device may include means for inputting one or more information symbols of a set of information symbols into one or more respective channels of a polar encoder to obtain a set of encoded information symbols, where a respective information symbol input into a respective channel includes at least two information bits, and where a respective encoded information symbol obtained from the polar encoder includes at least two encoded information bits, means for performing a mapping procedure on the set of encoded information symbols, where the mapping procedure maps the set of encoded information symbols to one or more constellation points associated with a modulation scheme for transmission of the set of encoded information symbols to obtain a mapped set of encoded information symbols, and means for transmitting a message including the mapped set of encoded information symbols.

A non-transitory computer-readable medium storing code for wireless communications is described. The code may include instructions executable by one or more processors to input one or more information symbols of a set of information symbols into one or more respective channels of a polar encoder to obtain a set of encoded information symbols, where a respective information symbol input into a respective channel includes at least two information bits, and where a respective encoded information symbol obtained from the polar encoder includes at least two encoded information bits, perform a mapping procedure on the set of encoded information symbols, where the mapping procedure maps the set of encoded information symbols to one or more constellation points associated with a modulation scheme for transmission of the set of encoded information symbols to obtain a mapped set of encoded information symbols, and transmit a message including the mapped set of encoded information symbols.

In some examples of the method, wireless devices, and non-transitory computer-readable medium described herein, performing the mapping procedure may include operations, features, means, or instructions for inputting each encoded information symbol of the set of encoded information symbols into a mapping function to map each encoded information symbol to a respective constellation point of the one or more constellation points.

In some examples of the method, wireless devices, and non-transitory computer-readable medium described herein, the mapping function may be a symbol-level gray labeling function.

In some examples of the method, wireless devices, and non-transitory computer-readable medium described herein, performing the mapping procedure may include operations, features, means, or instructions for mapping a first encoded information symbol of the set of encoded information symbols to a set of most significant bits of a first constellation point of the one or more constellation points and mapping a second encoded information symbol of the set of encoded information symbols to a set of least significant bits of the first constellation point.

In some examples of the method, wireless devices, and non-transitory computer-readable medium described herein, performing the mapping procedure may include operations, features, means, or instructions for converting the set of encoded information symbols into a string of encoded information bits and inputting each encoded information bit of the string of encoded information bits into a mapping function to map each encoded information bit to a respective constellation point of the one or more constellation points.

In some examples of the method, wireless devices, and non-transitory computer-readable medium described herein, performing the mapping procedure may include operations, features, means, or instructions for mapping a first set of multiple bits of the string of encoded information bits to a first constellation point of the one or more constellation points and mapping a second set of multiple bits of the string of encoded information bits to a second constellation point of the one or more constellation points.

In some examples of the method, wireless devices, and non-transitory computer-readable medium described herein, one or more reliability levels associated with the mapped set of encoded information symbols may be below a threshold reliability.

In some examples of the method, wireless devices, and non-transitory computer-readable medium described herein, the mapping function may be a bit-level gray labeling function.

In some examples of the method, wireless devices, and non-transitory computer-readable medium described herein, inputting the one or more information symbols into the one or more respective channels of the polar encoder may include operations, features, means, or instructions for inputting each respective one of the set of information symbols into a respective channel of the polar encoder.

Some examples of the method, wireless devices, and non-transitory computer-readable medium described herein may further include operations, features, means, or instructions for selecting a mapping function associated with the mapping procedure based on a gain associated with the mapping function, an error rate associated with the mapping function, a signal-to-noise ratio associated with a wireless channel, or any combination thereof.

A method for wireless communications by a wireless device is described. The method may include receiving a message including a mapped set of encoded information symbols, performing a demapping procedure on the mapped set of encoded information symbols, where the demapping procedure demaps the mapped set of encoded information symbols to obtain a set of encoded information symbols, a respective encoded information symbol of the set of encoded information symbols including at least two encoded information bits, and inputting one or more encoded information symbols of the set of encoded information symbols into one or more respective channels of a polar decoder to obtain a set of information symbols, where a respective information symbol of the set of information symbols obtained from the polar decoder includes two information bits.

A wireless device for wireless communications is described. The wireless device may include one or more memories storing processor executable code, and one or more processors coupled with the one or more memories. The one or more processors may individually or collectively be operable to execute the code to cause the wireless device to receive a message including a mapped set of encoded information symbols, perform a demapping procedure on the mapped set of encoded information symbols, where the demapping procedure demaps the mapped set of encoded information symbols to obtain a set of encoded information symbols, a respective encoded information symbol of the set of encoded information symbols including at least two encoded information bits, and input one or more encoded information symbols of the set of encoded information symbols into one or more respective channels of a polar decoder to obtain a set of information symbols, where a respective information symbol of the set of information symbols obtained from the polar decoder includes two information bits.

Another wireless device for wireless communications is described. The wireless device may include means for receiving a message including a mapped set of encoded information symbols, means for performing a demapping procedure on the mapped set of encoded information symbols, where the demapping procedure demaps the mapped set of encoded information symbols to obtain a set of encoded information symbols, a respective encoded information symbol of the set of encoded information symbols including at least two encoded information bits, and means for inputting one or more encoded information symbols of the set of encoded information symbols into one or more respective channels of a polar decoder to obtain a set of information symbols, where a respective information symbol of the set of information symbols obtained from the polar decoder includes two information bits.

A non-transitory computer-readable medium storing code for wireless communications is described. The code may include instructions executable by one or more processors to receive a message including a mapped set of encoded information symbols, perform a demapping procedure on the mapped set of encoded information symbols, where the demapping procedure demaps the mapped set of encoded information symbols to obtain a set of encoded information symbols, a respective encoded information symbol of the set of encoded information symbols including at least two encoded information bits, and input one or more encoded information symbols of the set of encoded information symbols into one or more respective channels of a polar decoder to obtain a set of information symbols, where a respective information symbol of the set of information symbols obtained from the polar decoder includes two information bits.

In some examples of the method, wireless devices, and non-transitory computer-readable medium described herein, performing the demapping procedure may include operations, features, means, or instructions for inputting each mapped encoded information symbol of the mapped set of encoded information symbol into a demapping function to demap each mapped encoded information symbol of the mapped set of encoded information symbol from a respective constellation point of one or more constellation points.

In some examples of the method, wireless devices, and non-transitory computer-readable medium described herein, performing the demapping procedure may include operations, features, means, or instructions for inputting each of the mapped set of encoded information symbols into a demapping function to obtain one or more strings of encoded information bits associated with the mapped set of encoded information bits and converting the one or more strings of encoded information bits into the set of encoded information symbols.

In some examples of the method, wireless devices, and non-transitory computer-readable medium described herein, performing the demapping procedure may include operations, features, means, or instructions for inputting each of the mapped set of encoded information symbols into a symbol-level max-log-map demapper.

Some examples of the method, wireless devices, and non-transitory computer-readable medium described herein may further include operations, features, means, or instructions for obtaining a respective logarithmic probability mass function associated with each of the set of information symbols.

In some examples of the method, wireless devices, and non-transitory computer-readable medium described herein, each respective logarithmic probability mass function may be based on a set of multiple probabilities associated with possible values of a respective one of the set of information symbols.

In some examples of the method, wireless devices, and non-transitory computer-readable medium described herein, inputting the one or more encoded information symbols into the one or more respective channels of the polar decoder may include operations, features, means, or instructions for inputting each respective one of the set of encoded information symbols into a respective channel of the polar decoder.

DETAILED DESCRIPTION

In some wireless communications systems, a transmitting device may perform encoding and modulation prior to transmitting a string of information bits (e.g., k information bits). For example, the transmitting device may encode N bits (e.g., including the k information bits), and may map each of the N encoded bits to a constellation point defined by a modulation scheme. Such techniques may result in a relatively higher likelihood that a receiving device may successfully receive and decode the k information bits. In some examples, however, the transmitting device may perform nonbinary polar encoding on a set of information symbols, each information symbol including more than one (e.g., two) bits. The transmitting device may therefore generate a set of encoded symbols each including multiple bits (e.g., two bits per symbol). In such examples, the transmitting device may not map the encoded symbols (e.g., bit pairs, set of bits representative of a nonbinary number) in a same manner as encoded single bits (e.g., a single encoded binary bit representative of a binary number).

Accordingly, in some examples, a transmitting device may perform a modulation of a set of encoded symbols (e.g., bit pairs) that are encoded using a nonbinary polar encoding scheme. For example, the transmitting device may map each symbol of a set of encoded symbols to a constellation point. Additionally, or alternatively, the transmitting device may convert the encoded symbols into strings of bits. For example, the transmitting device may convert a set of four symbols into a string of eight bits. The transmitting device may accordingly perform bit-to-constellation mapping of the resulting bitstring using a mapping scheme. A receiving device may demodulate a received message by performing a demodulation of the set of modulated symbols or bits (e.g., and by converting the bitstring into the set of information symbols).

Accordingly, in some examples, a transmitting device may perform a modulation of a set of symbols (e.g., bit pairs) that are encoded using a nonbinary polar encoding scheme. For example, the transmitting device may map each symbol of a set of encoded symbols to a constellation point. Additionally, or alternatively, the transmitting device may convert the encoded symbols into strings of bits. The transmitting device may accordingly perform bit-to-constellation mapping of the resulting bitstring according to a mapping scheme.

Aspects of the disclosure are initially described in the context of wireless communications systems. Aspects of the disclosure are further illustrated by and described with reference to block diagrams, process flows, apparatus diagrams, system diagrams, and flowcharts that relate to modulation schemes for nonbinary polar coding.

Figure 1:
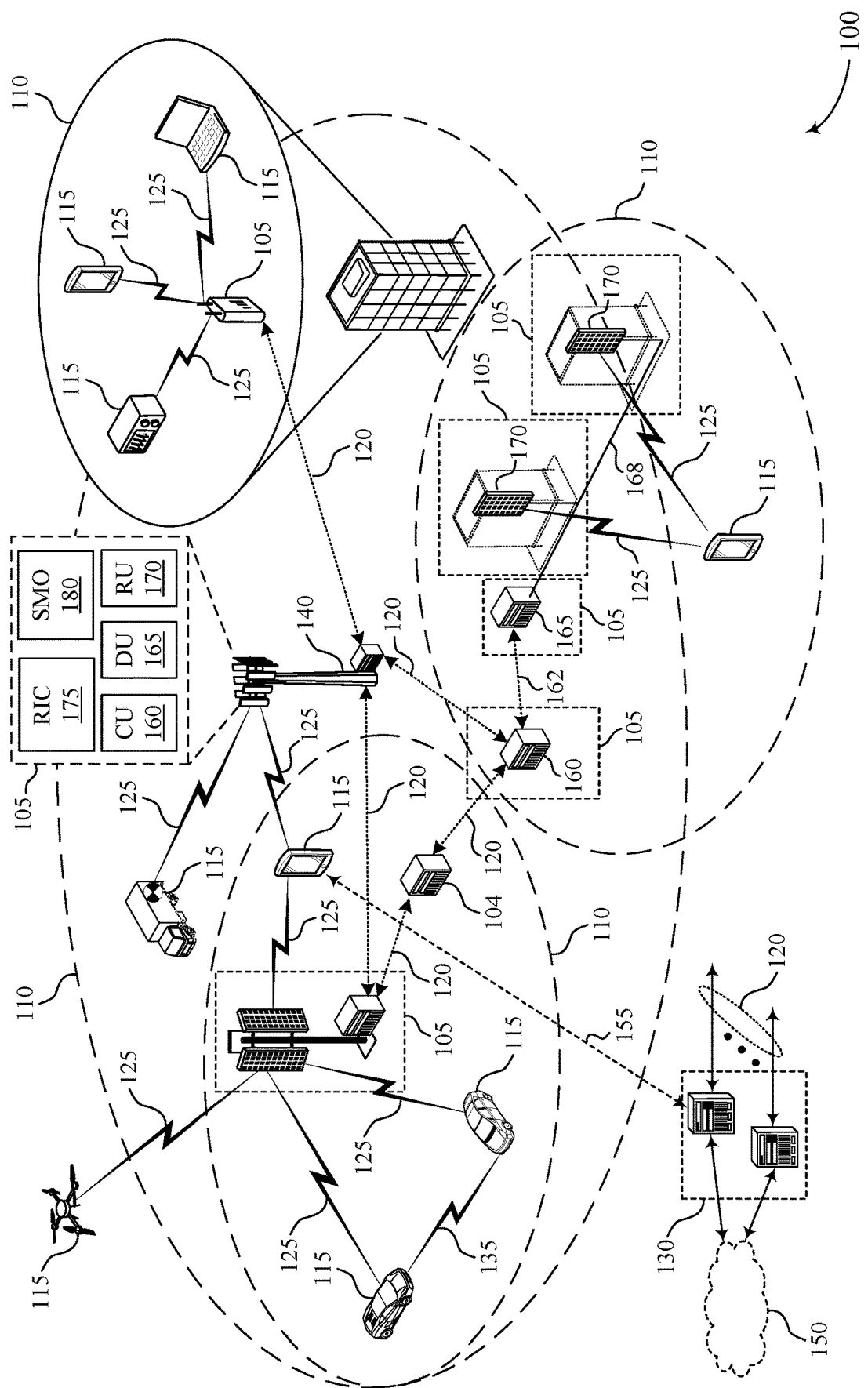
FIG. 1 shows an example of a wireless communications system that supports modulation schemes for nonbinary polar coding in accordance with one or more aspects of the present disclosure.

FIG. 1 shows an example of a wireless communications system 100 that supports modulation schemes for nonbinary polar coding in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and Ne may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

To transmit information, a transmitting device (e.g., a UE 115, a network entity 105) may encode a set of information bits via an encoder. An encoder may have a finite input bus width or input bits of a single input vector may become available at different times. For example, an input vector may include information bits, check bits, frozen bits, etc., where some or all information bits may be generated by or received from different sources. For example, bits that are not allocated as information bits may be assigned as parity bits or frozen bits. Parity bits may be used in parity check (PC) polar coding techniques and frozen bits may be bits of a given value (0, 1, etc.) known to the both the encoder and decoder (e.g., the encoder encoding information bits at a transmitter and the decoder decoding the codeword received at a receiver). Construction of an input vector may depend on information bit location/distribution amongst the channel instances of the encoder. In some cases, different input vectors containing the same information bits (e.g., input vectors with a different allocation of information bits) may be received with different success rates (e.g., encoded according to different reliabilities). For example, an input vector with information bits distributed such that the information bits are loaded to channel instances associated with high reliability metrics may be decoded at an increased success rate. The input vector may be, for example, a physical channel message (e.g., control channel message) or a data or shared channel message (e.g., a data packet).

System performance of transmission of information bits in low-latency environments may be determined by factors such as overhead, coding gain, transmission pipelining, and decoding delay. Some processing techniques may emphasize improving transmission pipelining and decoding delay at the expense of higher overhead and lower coding gain. Generally, use of a larger code length (e.g., larger codeword) provides higher coding gain. However, a larger code length result in a larger decoding delay and overall system latency. In contrast, smaller code length reduces latency or decoding delay, but may result in an increase in overhead or lower coding gain.

In some examples, the transmitting device (e.g., a network entity 105, a UE 115) may perform a modulation of a set of encoded symbols (e.g., bit pairs) that are encoded using a nonbinary polar encoding scheme. For example, the transmitting device may map each symbol of a set of encoded symbols to a constellation point. Additionally, or alternatively, the transmitting device may convert the encoded symbols into strings of bits. For example, the transmitting device may convert a set of four symbols into a string of eight bits (or more bits depending on the quantity of bits per symbol). The transmitting device may accordingly perform bit-to-constellation mapping of the resulting bitstring using a mapping scheme. A receiving device (e.g., a network entity 105, a UE 115) may demodulate a received message by performing a demodulation of the set of modulated symbols or bits (e.g., and by converting the bitstring into the set of information symbols.

Figure 2:
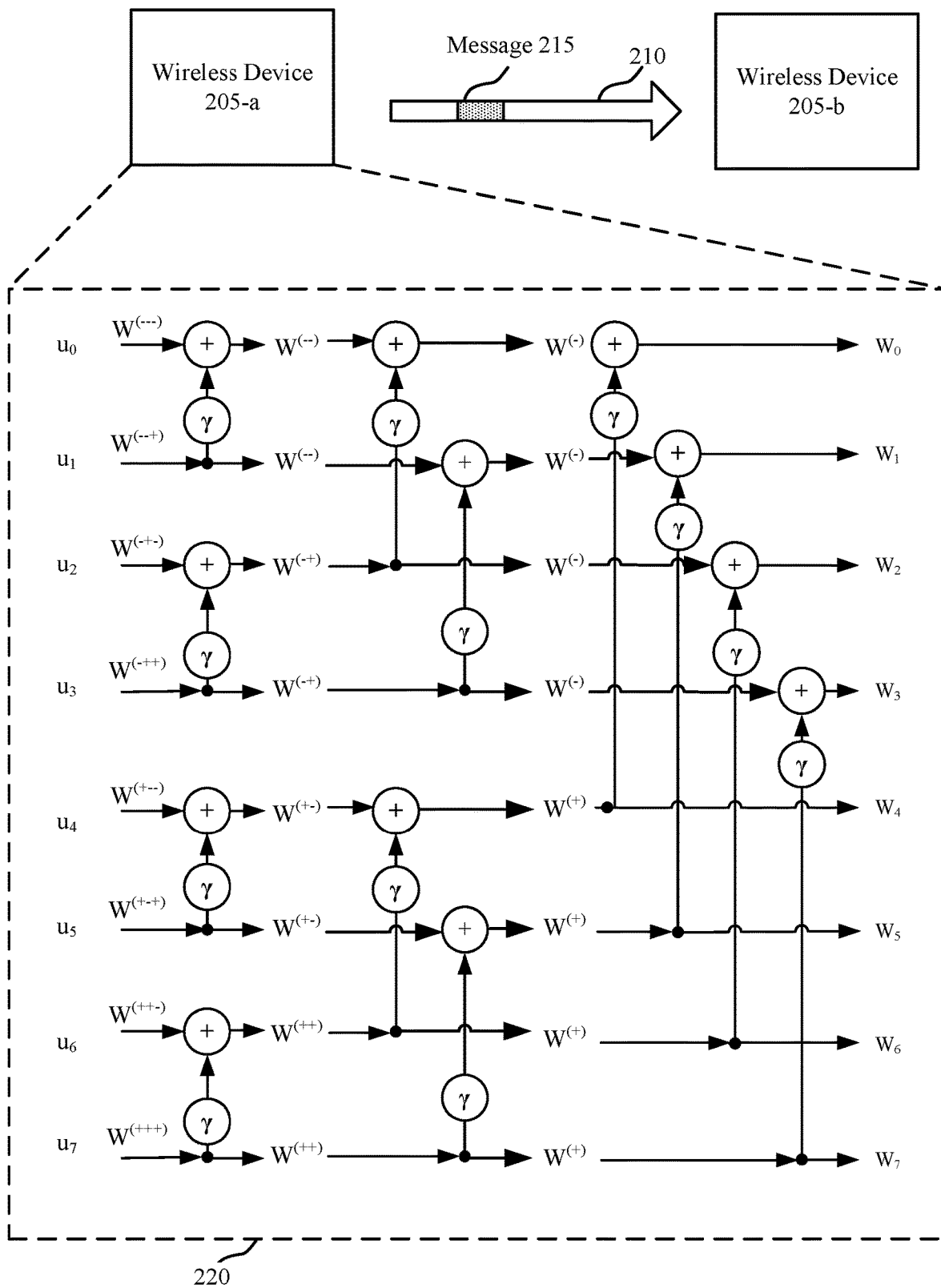
FIG. 2 shows an example of a wireless communications system that supports modulation schemes for nonbinary polar coding in accordance with one or more aspects of the present disclosure.

FIG. 2 shows an example of a wireless communications system 200 that supports modulation schemes for nonbinary polar coding in accordance with one or more aspects of the present disclosure. The wireless communications system 200 may implement or may be implemented by aspects of the wireless communications system 100. For example, the wireless communications system 200 may be implemented by one or more wireless devices 205, which may be examples of UEs 115 or network entities 105 as described with reference to FIG. 1.

In some examples, a wireless device 205-a may transmit a message 215 to a wireless device 205-b via a channel 210. The message 215 may include, for example, a control message, a data message, or another type of message. The message 215 may indicate one or more bits of information to the wireless device 205-b via modulation. That is, the wireless device 205-a may map one or more bits to constellation points according to a modulation scheme. Each constellation point may be indicative of an amplitude (e.g., power) of a signal and a phase shift of the signal (e.g., relative to a reference signal), where the message 215 is conveyed via the signal.

Each constellation point may be a point in a constellation diagram, where the amplitude and phase shift associated with each constellation point is defined according to a distance of the constellation point from an origin of a set of axes (e.g., a point at which a horizontal axis and a vertical axis intersect) and an angle of the constellation point measured (e.g., counter-clockwise) from the horizontal axis, respectively. For example, in an 8 phase shift keying (PSK) modulation scheme, a point that is a distance 1 from the origin and a distance of 90° from the horizontal axis may indicate three bits (e.g., 010). The wireless device 205-a may accordingly convey the bits 010 to the wireless device 205-b by modulating the carrier signal to have an amplitude of 1 and a phase shift of 90°. To convey a set of bits, the wireless device 205-a may perform a bit-to-constellation mapping (e.g., as a function of bit groups, such as octets for 256 quadrature amplitude modulation (QAM) modulation).

Each constellation point may be indicative of a quantity of bits. For example, for 16QAM, the wireless device 205-a may map the bits to 16 different constellation points in a 16QAM constellation diagram, and each constellation point may be indicative of four bits. Other modulation schemes (e.g., 8QAM, 258QAM, quadrature phase shift keying (QPSK), binary phase shift keying (BPSK)) may indicate other quantities of bits per constellation point. In some examples, a modulation scheme with relatively more bits per constellation point (e.g., a higher-order modulation scheme) may result in reduced latency as compared to a modulation scheme with relatively fewer bits per constellation point as a result of transmitting relatively more bits at a time. However, such higher-order modulation schemes may have a relatively lower likelihood of a message 215 being correctly received and decoded by the wireless device 205-b (e.g., due to noise via the channel 210, interference, and a relatively smaller distance between constellation points on a respective constellation diagram of the higher-order modulation scheme).

In some examples, to increase a likelihood that the wireless device 205-b may successfully receive and decode a message 215, the wireless device 205-a may encode the message 215 using a polar encoding scheme. That is, the wireless device 205-a may input a set of bits (e.g., a set of information bits and a set of frozen bits with a set value of 0 or 1) into a corresponding set of channels (e.g., channels $u_0$ through $u_7$). The channels may output an encoded set of bits that include information about the input set of bits (e.g., via one or more exclusionary or (XOR) operations performed on the set of channels). The encoded set of bits may include relatively more information related to some channels (e.g., a first subset of channels) and relatively less information related to some other channels (e.g., a second subset of channels). Accordingly, to increase a likelihood that the wireless device 205-b may successfully receive the set of information bits, the wireless device 205-a may input the information bits (e.g., and one or more bits related to performing integrity checks and the like, such as parity bits or a cyclic redundancy check (CRC)) into the first subset of channels and the set of frozen bits into the second subset of channels.

The wireless device 205-a may perform a modulation on the encoded set of bits by mapping each of the encoded set of bits to a constellation point. The wireless device 205-a may determine a constellation point to map each of the encoded set of bits to using a bit-to-constellation mapping scheme, such as a Gray labeling scheme. The bit-to-constellation mapping scheme may be, for example, a function which defines a constellation point for each of the encoded set of bits.

In some aspects, the wireless device 205-a may perform a nonbinary polar coding procedure. For example, for a 4-ary polar code, the wireless device 205-a may encode a set of information symbols including a two information bit payload (e.g., and a set of frozen symbols with bits set to 00). That is, the wireless device 205-a may input each information symbol the set of information symbols and the set of frozen symbols (e.g., the symbols $u_0$ through $u_7$, as illustrated with reference to FIG. 2) into respective channels of a nonbinary encoder 220 (e.g., channels $W^{(---)}$ through $W^{(+++)}$, as illustrated with reference to FIG. 2). For one or more other nonbinary polar codes, the wireless device 205-a may input sets of information and frozen symbols including different quantities of information bits (e.g., greater than two bits per symbol) into channels of a nonbinary encoder 220.

The encoder may encode the set of symbols u with $N=2^m$, K code defined over a finite field GF(4) where K may represent the quantity of information symbols (e.g., information symbols $i_0$ through $i_{K-1}$), N may represent the quantity of polar coded bits or the polar code length (e.g., a power of 2 defined using a 2 by 2 kernel G), and m may represent an integer such that $2^m=N$. The elements of the finite field GF(4) (e.g., or $GF(2^2)$) may be represented by {0, 1, α, α²=α+1}, or by {00, 01, 10, 11} of two-dimensional vector space over GF(2). That is, a binary representation of coded symbols given by φ: GF(4)→{0,1}² may be as follows: 0→00, 1→01, 2→10, 3→11.

To encode the set of symbols using the nonbinary encoder 220, the wireless device 205-a may perform operations across the set of channels W. For example, the wireless device 205-a may multiple the symbol $u_1$ by a general nonbinary kernel G=

$$\begin{pmatrix} 1 & 0 \\ \gamma & 1 \end{pmatrix}^{\otimes m}$$

(e.g., with a recursive structure), where γ is a non-zero element of GF(4) (e.g., γ∈{1, α, α²}, γ∈{01, 10, 11}), and where m is defined as an integer such that $2^m=N$. The multiplication operation of a symbol $u_i$ with the kernel G may generate a matrix $c_i$, defined as $$c_i = u_i \begin{pmatrix} 1 & 0 \\ \gamma & 1 \end{pmatrix}^{\otimes m},$$

that satisfies $u_i, c_i \in GF(4)$. For GF(4) with elements {0, 1, α, α²=α+1}, the multiplication operation of a bit x with γ may result in 0·x=0, 1·x=x, or α³=1. The multiplication operations are illustrated with reference to FIG. 2 by the symbol γ.

The wireless device 205-b may add the resulting matrix $c_i$ to a symbol input into a different channel W. The addition operations may be performed coordinate-wise (e.g., bit-wise). The addition operations are illustrated with reference to FIG. 2 by the symbol +.

In some examples, if γ is not equal to 1 (e.g., 01, as represented in binary), the matrix $$\begin{pmatrix} 1 & 0 \\ \gamma & 1 \end{pmatrix}^{\otimes m}$$

may polarize $2^m$ copies of a given channel W into subchannels $w^{(i)}$. A subchannel $W^{(i)}$ may be almost noisy (e.g., with a lower channel quality and a lower likelihood of being decoded correctly) if an operation $I(W^{(i)})$ approaches 0, or almost noiseless (e.g., with a higher channel quality and a higher likelihood of being decoded correctly) if the operation $I(W^{(i)})$ approaches 2. That is, a higher value of the operation $I(W^{(i)})$ may correspond to a higher capacity (e.g., a higher likelihood of being decoded correctly). In some examples, if γ may be equal to 1, the operation $I(W^{(i)})$ on some subchannels $W^{(i)}$ may approach 1. The wireless device 205-a may map the set of information symbols $i_0$ through $i_{K-1}$ to subchannels corresponding to the K highest values of the operation $I(W^{(i)})$.

The nonbinary encoder 220 may output a set of encoded symbols (e.g., a codeword of encoded symbols $W_0$ through $W_7$). Each encoded symbol may have multiple encoded bits (e.g., two encoded bits for a 4-ary polar code). The wireless device 205-a may perform a modulation on the set of encoded symbols by mapping the encoded symbols to constellation points. That is, the wireless device 205-b may perform a codeword-to-constellation mapping (e.g., to increase or maximize channel performance, such as by increasing a signal-to-noise ratio (SNR) or increasing a likelihood that the wireless device 205-b may decode the message 215 correctly).

In some aspects, the wireless device 205-a may perform a direct symbol-to-constellation mapping by defining a mapping as a function of GF(4) symbols. That is, the wireless device 205-a may map each symbol to a respective constellation point. Additionally, or alternatively, the wireless device 205-a may perform an indirect codeword-to-constellation mapping by converting tuples of GF(4) symbols to bit strings, and using a bit-to constellation mapping function (e.g., Gray labeling or another function defining a constellation point mapped to each bit). Accordingly (e.g., for a 16QAM modulation scheme), the wireless device 205-a may map both bits of an encoded symbol $c_0$ to a same 4-pulse amplitude modulation (PAM) symbol (e.g., constellation point) with two bits per constellation point or may map each bit of $c_0$ to a different 4-PAM symbol (e.g., constellation point) symbol-level max-log-map demappers. Such mapping techniques are described in further detail with reference to FIG. 3.

The wireless device 205-b may receive the message 215 (e.g., as a set of modulated and encoded symbols) and perform a demapping (e.g., demodulation) procedure to generate a set of encoded symbols. For example, the wireless device 205-b may perform a symbol-level demodulation procedure using a symbol-level max-log-map demapper, or a bit-level max-log-map demapper (e.g., to independently demodulate bits $b_0$, $b_1$ of a symbol $c_0$). The bit-level max-log-map demapper may be represented according to Equations 1 and 2 below, where Equation 1 represents a demapping of bit $b_0$ and Equation 2 represents a demapping of bit $b_1$.

$$\log\left(\frac{p(b_0 = 1 | y)}{p(b_0 = 0 | y)}\right) = \frac{(y - \mu^*_{0,.}(y))^2 - (y - \mu^*_{1,.}(y))^2}{2\sigma^2} \quad (1)$$

$$\log\left(\frac{p(b_1 = 1 | y)}{p(b_1 = 0 | y)}\right) = \frac{(y - \mu^*_{.,0}(y))^2 - (y - \mu^*_{.,1}(y))^2}{2\sigma^2} \quad (2)$$

As described with reference to Equations 1 and 2, $p(b_0=i|y)$ and $p(b_1=i|y)$ may be probabilities that bit $b_0$ and bit $b_1$ are equal to a value i, respectively, $\mu^*_{i,.}(y)$ and $\mu^*_{.,i}(y)$ may be the closest constellation points to a symbol y with $b_0=i$ and $b_0=i$, respectively, and σ may be a standard distribution of normally-distributed noise associated with a wireless channel between the encoding device and the decoding device.

If both bits of a symbol are mapped to a same constellation point, the wireless device 205-b may use a symbol-level max-log-map demapper, represented according to Equation 3 below.

$$\log\left(\frac{p(c_0 = i | y)}{p(c_0 = 0 | y)}\right) = \frac{(y - \mu^*_0(y))^2 - (y - \mu^*_1(y))^2}{2\sigma^2} \quad (3)$$

As described with reference to Equation 3, $p(c_0=i|y)$ may be a probability that the symbol $c_0$ is equal to a value i, $\mu^*_i(y)$ may be the closest constellation points corresponding to $c_0=i$, respectively, and σ may be the standard distribution of normally-distributed noise associated with the wireless channel between the encoding device and the decoding device. In some examples (e.g., as the wireless device 205-b may demodulate a whole symbol, rather than individual bits), mappings from GF(4) to 4-PAM symbols (e.g., constellation points) may each have a same performance (e.g., a same change of being decoded correctly).

In some examples, for a higher-order QAM scheme (e.g., 256 QAM with 16-PAM modulation symbols or constellation points and four bits per constellation point), the wireless device 205-a may map two bits of a first coded GF(4) symbol $c_0$ to two most significant bits (MSBs) of a modulation symbol (e.g., constellation point) x, and may map two bits of a second coded GF(4) symbol $c_1$ to two least significant bits (LSBs) of x (e.g., symbol-independent coded modulation (SICM)). Such mapping techniques are described in further detail with reference to FIG. 3. In such examples, to demap the message 215 with a symbol-level max-log-map demapper, the wireless device 205-b may use Equations 4 and 5 below to demap the symbol $c_0$ and the symbol $c_1$, respectively.

$$\log\left(\frac{p(c_0 = i \mid y)}{p(c_0 = 0 \mid y)}\right) = \frac{(y - \mu^*_{0,.}(y))^2 - (y - \mu^*_{i,.}(y))^2}{2\sigma^2} \quad (4)$$

$$\log\left(\frac{p(c_1 = i \mid y)}{p(c_1 = 0 \mid y)}\right) = \frac{(y - \mu^*_{.,0}(y))^2 - (y - \mu^*_{.,i}(y))^2}{2\sigma^2} \quad (5)$$

As described with reference to Equations 4 and 5, $\mu^*_{i,.}(y)$ and $\mu^*_{.,i}(y)$ may represent closest constellation points to a received symbol y that have $\phi(i)$ in MSBs and LSBs, respectively, where $\phi(i)$ is a mapping from elements of GF(4) to bit pairs (e.g., such that $\phi(0)=00$, $\phi(1)=01$, $\phi(2)=10$, $\phi(3)=11$). In some examples, for arbitrary mapping of bits ($\phi(c_0)$, $\phi(c_1)$) (e.g., if the bits of $c_0$ and $c_1$ are not mapped to the MSBs and LSBs of x), the wireless device 205-b may use a different subset of constellation points corresponding to fixed bit values used to compute $\mu^*_{i,.}(y)$ and $\mu^*_{.,i}(y)$.

The wireless device 205-b may perform a decoding procedure (e.g., using a nonbinary decoder) to generate a set of symbols y with multiple (e.g., two) bits per symbol, and may determine a value for each bit of each symbol y. The set of symbols y may include information symbols (e.g., with two or more information bits) and frozen symbols.

To decode the message 215, the wireless device 205-b may generate a statistic p(c|y) representing the probability that each received symbol y is equal to a value c. For a nonbinary alphabet (e.g., nonbinary encoding and decoding with multiple bits per symbol), the wireless device 205-b may generate a logarithmic probability mass function (LMPF) (e.g., rather than a single log likelihood ratio (LLR) value) representing the probability. For example, the wireless device 205-b may generate, for each symbol y, a LMPF s, where each entry in the LMPF is a piecewise linear function of the received symbols y, defined according to Equation 6 below.

$$s = \quad (6)$$

$$\left[\log\left(\frac{p(c=0\mid y)}{p(c=0\mid y)}\right) \log\left(\frac{p(c=1\mid y)}{p(c=0\mid y)}\right) \log\left(\frac{p(c=2\mid y)}{p(c=0\mid y)}\right) \log\left(\frac{p(c=3\mid y)}{p(c=0\mid y)}\right)\right]$$

As described with reference to Equation 6, p(c=0|y) may represent a probability that a symbol c is equal to 0 (e.g., with bits 00), p(c=1|y) may represent a probability that a symbol c is equal to 1 (e.g., with bits 01), p(c=2|y) may represent a probability that a symbol c is equal to 2 (e.g., with bits 10), and p(c=3|y) may represent a probability that a symbol c is equal to 3 (e.g., with bits 11). The term $$\log\left(\frac{p(c=0\mid y)}{p(c=0\mid y)}\right)$$

may be equal to 0; thus, wireless device 205-b may use the values of $$\log\left(\frac{p(c=i\mid y)}{p(c=0\mid y)}\right),$$

where i≠0, to determine the LMPF. The functions $$\log\left(\frac{p(c=i\mid y)}{p(c=0\mid y)}\right)$$

may be the symbol-level max-log-map demappers represented with reference to Equations 3, 4, and 5, or one or more other symbol-level max-log-map demappers.

Figure 3:
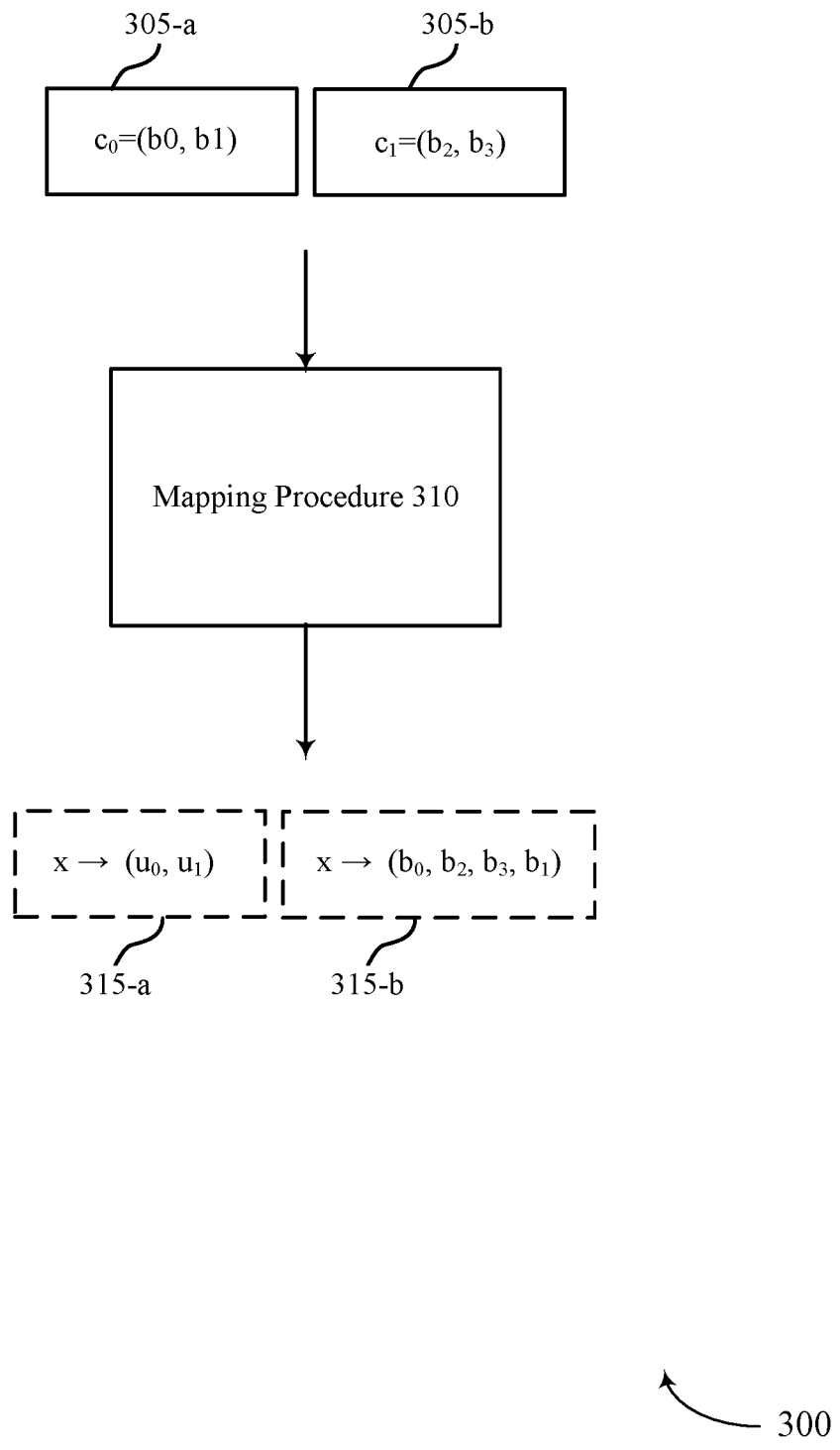
FIG. 3 shows an example of a block diagram that supports modulation schemes for nonbinary polar coding in accordance with one or more aspects of the present disclosure.

FIG. 3 shows an example of a block diagram 300 that supports modulation schemes for nonbinary polar coding in accordance with one or more aspects of the present disclosure. The block diagram 300 may implement or may be implemented by aspects of the wireless communications system 100 or the wireless communications system 200. For example, the block diagram 300 may be implemented by one or more wireless devices, which may be examples of UEs 115 or network entities 105 as described with reference to FIG. 1.

In some examples, a wireless device may perform a mapping procedure 310 on a set of encoded symbols (e.g., symbols encoded using a nonbinary polar encoder), including a symbol 305-a (e.g., $c_0$) with bits ($b_0$, $b_1$) and a symbol 305-b (e.g., $c_1$) with bits ($b_2$, $b_3$). The set of encoded symbols may include one or more additional symbols 305, and each symbol 305 may include one or more additional bits b.

The wireless device may perform the mapping procedure 310 to map each of the symbols 305 to a constellation point x. In some examples, the wireless device may perform symbol-to-constellation mapping 315-a to map each symbol 305 to a respective constellation point x. For example, for a 256QAM modulation scheme (e.g., with 16-PAM symbols), the wireless device may map the bits of the symbol 305-a to two or more MSBs of x and the bits of the symbol 305-a to two or more LSBs of x. For other modulation schemes (e.g., for $M^2$-QAM with even $\log_2 M$), the wireless device may map a quantity $$\frac{\log_2 M}{2}$$

of symbols 305 to a real component of a complex constellation point x (e.g., a modulation symbol $x_0$) and a quantity $$\frac{\log_2 M}{2}$$

of symbols 305 to an imaginary component of the complex constellation point x (e.g., a modulation symbol $x_1$) such that $Re(x)=x_0$ and $Im(x)=x_1$.

In some examples, the symbol-to-constellation mapping 315-a may use a mapping function to map each symbol 305 to a constellation point. For example, for 256QAM (e.g., 16=PAM), a symbol-to-constellation mapping function may be defined as $(c_0, c_1) \rightarrow (3-2c_0)+4(3-2c_1)$. In general, to map a set of coded symbols 305 (e.g., a quantity of 2i+1 coded symbols 305 $(c_0, \ldots, c_{2i}))$ to (2i+1)-bit modulation symbols (e.g., constellation points), the wireless device may map symbols $(c_0, \ldots, c_{i-1})$ and a first bit of symbol $c_{2i}$ to a first modulation symbol (e.g., constellation point) $x_0$ and a second bit of symbol $c_{2i}$ and symbols $(c_i, \ldots, c_{2i-1})$ to a second modulation symbol (e.g., constellation point) $x_1$. For $2^{2(2i+1)}$-QAM symbols, the symbols $x_0$ and $x_1$ may be (2i+1)-bit real and imaginary symbols (e.g., I and Q symbols), respectively. That is, the wireless device may map symbols $(c_0, \ldots, c_{2i})$ to a complex-valued symbol x such that $Re(x)=x_0$ and $Im(x)=x_1$.

The wireless device may use one or more other symbol-to-constellation mapping functions, such as a symbol-level gray mapping function. In a symbol-level gray mapping, consecutive constellation points (e.g., modulation symbols) may differ in one GF(4) symbol. Gray labeling for SCIM may result in close symbol-level capacities such that a reliability associated with demodulating the symbol 305-a may be relatively close to a reliability associated with demodulation the symbol 305-b. For $2^{2(2i+1)}$-QAM (e.g., 64-QAM), the symbol-to-constellation mapping may be defined on a whole symbol level (e.g., in terms of a whole complex-valued symbol x) as $$(c_0, c_1) \rightarrow (-1)^{\lfloor \frac{c_0}{2} \rfloor}(4c_1 + (-1)^{c_0+c_1} + 2).$$

Additionally, or alternatively, the wireless device may perform bit-to-constellation mapping 315-b. For example, the wireless device may convert the symbols $c_0$ and $c_1$ to a string of bits (e.g., $(\phi(c_0), \phi(c_1))=(b_0, b_1, b_2, b_3)$) and may perform a mapping of each bit to a corresponding symbol. The wireless device may apply a permutation of bits (e.g., one or more nonequivalent permutations), such as $(b_0, b_1, b_2, b_3)$, $(b_0, b_2, b_1, b_3)$, or $(b_0, b_2, b_3, b_1)$.

The wireless device may apply a mapping function to map the 4-bit string (e.g., the permutation) to a 4-bit modulation symbol (e.g., constellation point) x. For example, for 256QAM (e.g., 16=PAM), a symbol-to-bit mapping function may be defined as $(c_0, c_1) \rightarrow (b_0, b_2, b_3, b_1)$, and a bit-to-constellation mapping function may be defined as $(b_0, b_2, b_3, b_1) \rightarrow 2(8b_0+4b_2+2b_3+b_1)-15$.

For 8-PAM, the wireless device may map three coded symbols $c_0, c_1, c_2$ to a bit string to obtain $(\phi(c_0), \phi(c_1), \phi(c_2))=(b_0, b_1, b_2, b_3, b_4, b_5)$. The wireless device may map $(b_0, b_1, b_4)$ to first modulation symbol (e.g., constellation point) $x_0$ and $(b_2, b_3, b_5)$ to a second modulation symbol (e.g., constellation point) $x_1$. Additionally, or alternatively, the wireless device may map $(b_0, b_4, b_1)$ to the first modulation symbol $x_0$ and $(b_2, b_5, b_3)$ to the second modulation symbol $x_1$. Additionally, or alternatively, the wireless device may map $(b_4, b_0, b_1)$ to the first modulation symbol $x_0$ and $(b_5, b_2, b_3)$ to the second modulation symbol $x_1$. Such mappings may result in symbols with two different reliability levels and a bit-to-constellation mapping may be constant for each triplet of symbols 305. Accordingly, such techniques may result in relatively less complex demodulation by a receiving wireless device.

In some examples, the wireless device may use one or more other bit-to-constellation mapping functions, such as a gray-labeling function (e.g., $(c_0, c_1) \rightarrow Gray(b_0, b_2, b_3, b_1)$). Gray labeling for bit-independent coded modulation (BICM) may result in close bit-level capacities such that a reliability associated with demodulating the bits of the symbol 305-a may be relatively close to a reliability associated with demodulation the bits of the symbol 305-b. In some examples, a bit-level gray labeling may also result in a symbol-level gray mapping.

In some examples, to select the mapping procedure 310, the wireless device may determine a gain of one or more mapping procedures 310. The wireless device may accordingly select a mapping procedure 310 with a gain that is relatively higher than a gain of one or more other mapping procedures 310. For example, a bit-to-constellation mapping 315-b with a mapping function that maps the permutation $(b_0, b_2, b_3, b_1)$ to a symbol x (e.g., as illustrated with reference to FIG. 3) may have a relatively higher gain that a bit-to-constellation mapping 315-b with a mapping function that maps the permutation $(b_0, b_1, b_2, b_3)$ to the symbol x. Additionally, the wireless device may select a mapping procedure 310 to result in similar bit-level or symbol-level capacities (e.g., and therefore similar demodulation reliability). For example, two mapping functions with same constellation subsets that correspond to different values of $c_0$ with a fixed value of $c_1$ up to a permutation may have similar (e.g., identical) demodulation performance for $c_0$ (e.g., and vice-versa).

Figure 4:
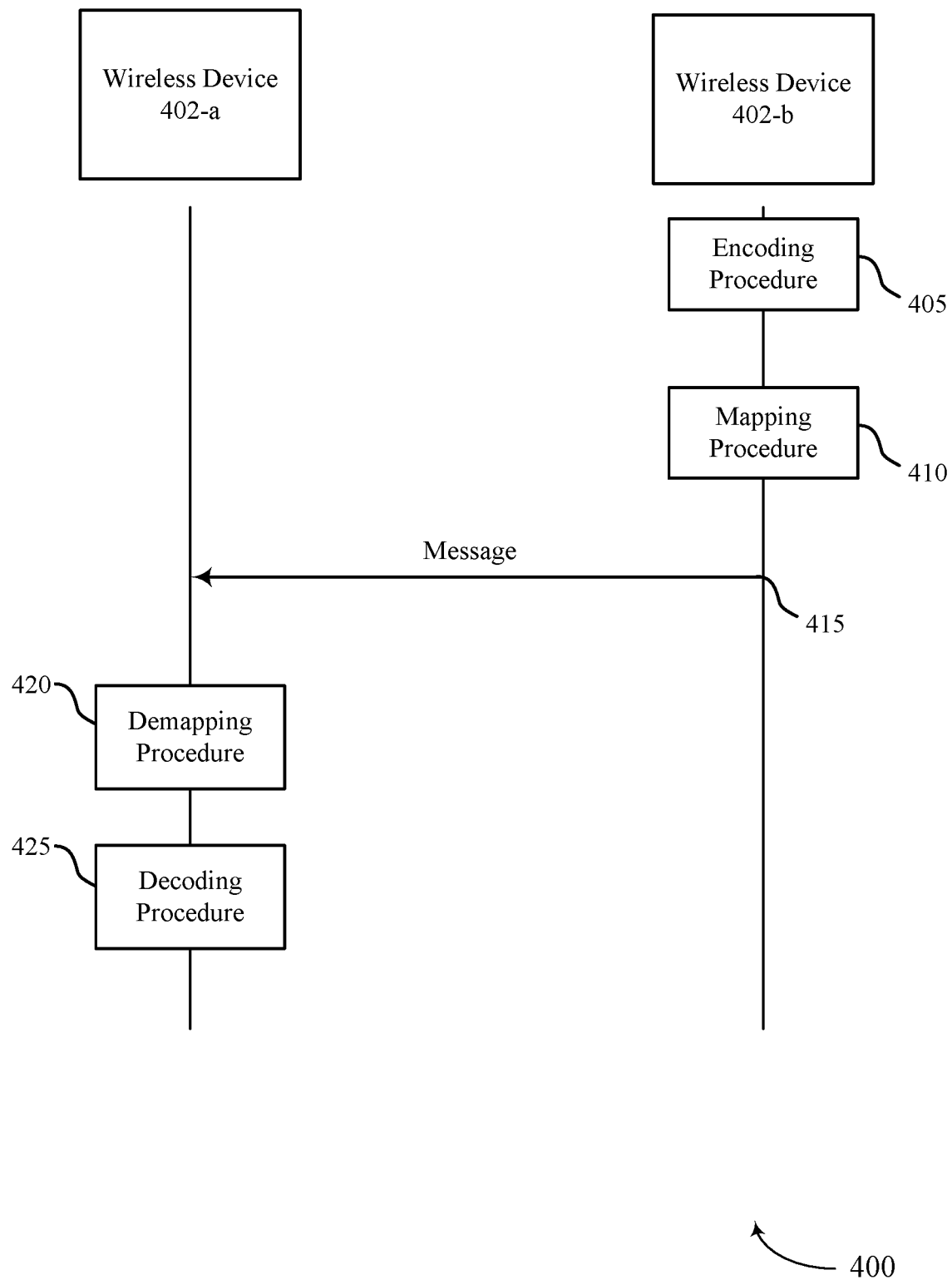
FIG. 4 shows an example of a process flow that supports modulation schemes for nonbinary polar coding in accordance with one or more aspects of the present disclosure.

FIG. 4 shows an example of a process flow 400 that supports modulation schemes for nonbinary polar coding in accordance with one or more aspects of the present disclosure. The process flow 400 may implement or may be implemented by aspects of the wireless communications system 100, the wireless communications system 200, or the block diagram 300. For example, the process flow 400 may be implemented by one or more wireless devices 402, which may be examples of UEs 115 or network entities 105 as described with reference to FIG. 1.

In the following description of the process flow 400, the operations between the wireless device 402-a and the wireless device 402-b may occur in a different order than the example order shown and, in some examples, may be performed by one or more different devices other than those shown as examples. Some operations also may be omitted from the process flow 400, and other operations may be added to the process flow 400. Further, although some operations or signaling may be shown to occur at different times for discussion purposes, these operations may actually occur at the same time.

At 405, the wireless device 402-b may perform an encoding procedure by inputting each of a set of symbols into one or more respective channels of a polar encoder. The set of information symbols may include one or more information symbols (e.g., with two or more information bits per symbol) and one or more frozen symbols (e.g., with two or more frozen bits per symbol). Each respective encoded information symbol obtained from the polar encoder may include at least two encoded information bits.

At 410, the wireless device 402-b may perform a mapping procedure on the set of encoded symbols (e.g., including the one or more encoded information symbols) to map the set of encoded symbols to one or more constellation points for transmission of the set of encoded symbols. The one or more constellation points may be associated with a modulation scheme (e.g., 256QAM, 16QAM, and the like). In some examples, the wireless device 402-b may select a mapping function associated with the mapping procedure (e.g., based on one or more of a gain of the mapping function, an error rate of the mapping function, a SNR of the mapping function, a reliability of decoding associated with the mapping function).

In some examples, the mapping procedure may include inputting each encoded symbol of the set of encoded symbols into a mapping function to map each encoded symbol to a respective constellation point (e.g., using a symbol-level gray labeling function or another mapping function). The wireless device 402-b may map each bit of a first encoded symbol of the set of encoded symbols to a set of MSBs of a first constellation point and each bit of a second encoded symbol of the set of encoded symbols to a set of LSBs of the first constellation point, or may map the respective bits of each symbol to a different bit of the first constellation point.

Additionally, or alternatively, the mapping procedure may include converting the set of encoded symbols into a string of encoded bits (e.g., including the encoded information bits). The wireless device 402-b may accordingly map each encoded bit of the string of encoded bits into a mapping function to map each encoded bit to a respective constellation point. For example, the wireless device 402-b may map a first plurality of bits (e.g., information bits) of the string of encoded bits to a first constellation point and a second plurality of bits (e.g., information bits) of the string of encoded bits to a second constellation point. The mapping function may be a bit-level gray labeling function or another mapping function. In some examples, one or more reliability levels associated with the mapped set of encoded symbols may be below a threshold reliability level.

At 415, the wireless device 402-b may transmit a message to a wireless device 402-a including the mapped set of encoded symbols (e.g., including the mapped set of encoded information symbols). The wireless device 402-a may receive the message from the wireless device 402-b (e.g., via a channel between the wireless device 402-a and the wireless device 402-b). The message may be a control message, a data message, or another type of message.

At 420, the wireless device 402-a may perform a demapping procedure on the mapped set of encoded symbols received via the message. The demapping procedure may demap the mapped set of encoded symbols from the constellation points associated with the modulation scheme. Each demapped encoded symbol of the set of encoded symbols may include two encoded bits (e.g., encoded information bits).

In some examples, performing the demapping procedure may include inputting each mapped encoded symbol into a demapping function to demap each symbol from a respective constellation point. In some examples, performing the demapping procedure may include inputting each of the mapped set of encoded symbols into a demapping function to obtain one or more strings of encoded bits, and converting the one or more strings of encoded bits into the set of encoded symbols. The demapping function may be a symbol-level max-log-map demapper.

In some examples, the wireless device 402-a may obtain a LPMF associated with a respective one of each of the set of encoded symbols (e.g., including the set of encoded information symbols). Each LMPF may be based on a plurality of probabilities of possible values of the respective encoded symbol.

At 425, the wireless device 402-a may perform an encoding procedure by inputting each of the encoded set of symbols into one or more respective channels of a polar decoder. The polar decoder may output a set of symbols, including the set of information symbols (e.g., with two or more information bits per symbol) and the set of frozen symbols (e.g., with two or more frozen bits per symbol).

Figure 5:
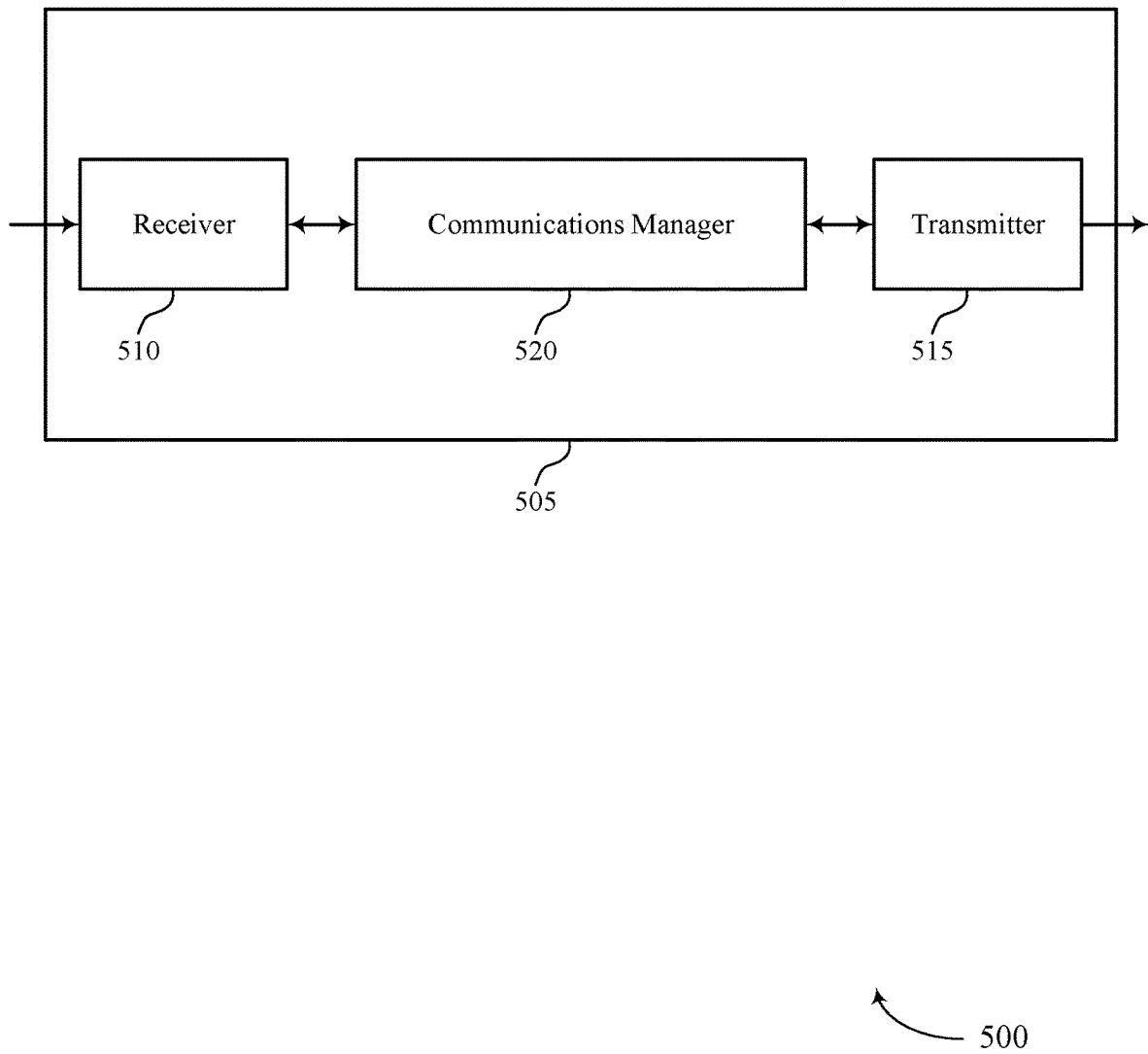
FIGS. 5 and 6 show block diagrams of devices that support modulation schemes for nonbinary polar coding in accordance with one or more aspects of the present disclosure.

FIG. 5 shows a block diagram 500 of a device 505 that supports modulation schemes for nonbinary polar coding in accordance with one or more aspects of the present disclosure. The device 505 may be an example of aspects of a UE 115 as described herein. The device 505 may include a receiver 510, a transmitter 515, and a communications manager 520. The device 505, or one or more components of the device 505 (e.g., the receiver 510, the transmitter 515, the communications manager 520), may include at least one processor, which may be coupled with at least one memory, to, individually or collectively, support or enable the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to modulation schemes for nonbinary polar coding). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to modulation schemes for nonbinary polar coding). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations or components thereof may be examples of means for performing various aspects of modulation schemes for nonbinary polar coding as described herein. For example, the communications manager 520, the receiver 510, the transmitter 515, or various combinations or components thereof may be capable of performing one or more of the functions described herein.

In some examples, the communications manager 520, the receiver 510, the transmitter 515, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 520, the receiver 510, the transmitter 515, or various combinations or components thereof may be implemented in code (e.g., as communications management software or firmware) executed by at least one processor (e.g., referred to as a processor-executable code). If implemented in code executed by at least one processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. For example, the communications manager 520 is capable of, configured to, or operable to support a means for inputting one or more information symbols of a set of information symbols into one or more respective channels of a polar encoder to obtain a set of encoded information symbols, where a respective information symbol input into a respective channel includes at least two information bits, and where a respective encoded information symbol obtained from the polar encoder includes at least two encoded information bits. The communications manager 520 is capable of, configured to, or operable to support a means for performing a mapping procedure on the set of encoded information symbols, where the mapping procedure maps the set of encoded information symbols to one or more constellation points associated with a modulation scheme for transmission of the set of encoded information symbols to obtain a mapped set of encoded information symbols. The communications manager 520 is capable of, configured to, or operable to support a means for transmitting a message including the mapped set of encoded information symbols.

Additionally, or alternatively, the communications manager 520 may support wireless communications in accordance with examples as disclosed herein. For example, the communications manager 520 is capable of, configured to, or operable to support a means for receiving a message including a mapped set of encoded information symbols. The communications manager 520 is capable of, configured to, or operable to support a means for performing a demapping procedure on the mapped set of encoded information symbols, where the demapping procedure demaps the mapped set of encoded information symbols to obtain a set of encoded information symbols, a respective encoded information symbol of the set of encoded information symbols including at least two encoded information bits. The communications manager 520 is capable of, configured to, or operable to support a means for inputting one or more encoded information symbols of the set of encoded information symbols into one or more respective channels of a polar decoder to obtain a set of information symbols, where a respective information symbol of the set of information symbols obtained from the polar decoder includes two information bits.

By including or configuring the communications manager 520 in accordance with examples as described herein, the device 505 (e.g., at least one processor controlling or otherwise coupled with the receiver 510, the transmitter 515, the communications manager 520, or a combination thereof) may support techniques for mapping and demapping symbols that are encoded using a nonbinary polar coding scheme, which may allow for more efficient utilization of communication resources.

Figure 6:
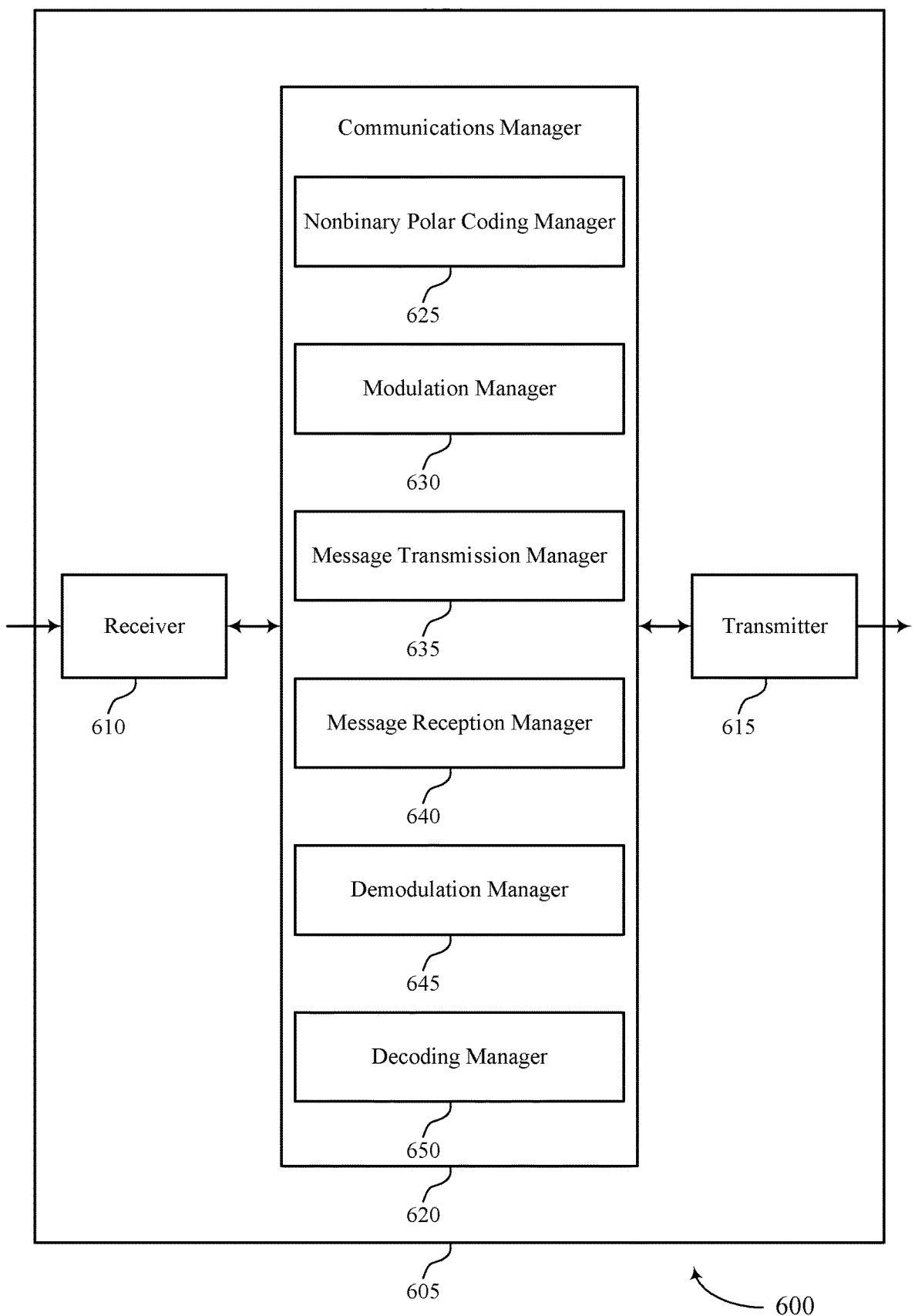

FIG. 6 shows a block diagram 600 of a device 605 that supports modulation schemes for nonbinary polar coding in accordance with one or more aspects of the present disclosure. The device 605 may be an example of aspects of a device 505 or a UE 115 as described herein. The device 605 may include a receiver 610, a transmitter 615, and a communications manager 620. The device 605, or one or more components of the device 605 (e.g., the receiver 610, the transmitter 615, the communications manager 620), may include at least one processor, which may be coupled with at least one memory, to support the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to modulation schemes for nonbinary polar coding). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to modulation schemes for nonbinary polar coding). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of modulation schemes for nonbinary polar coding as described herein. For example, the communications manager 620 may include a nonbinary polar coding manager 625, a modulation manager 630, a message transmission manager 635, a message reception manager 640, a demodulation manager 645, a decoding manager 650, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. The nonbinary polar coding manager 625 is capable of, configured to, or operable to support a means for inputting one or more information symbols of a set of information symbols into one or more respective channels of a polar encoder to obtain a set of encoded information symbols, where a respective information symbol input into a respective channel includes at least two information bits, and where a respective encoded information symbol obtained from the polar encoder includes at least two encoded information bits. The modulation manager 630 is capable of, configured to, or operable to support a means for performing a mapping procedure on the set of encoded information symbols, where the mapping procedure maps the set of encoded information symbols to one or more constellation points associated with a modulation scheme for transmission of the set of encoded information symbols to obtain a mapped set of encoded information symbols. The message transmission manager 635 is capable of, configured to, or operable to support a means for transmitting a message including the mapped set of encoded information symbols.

Additionally, or alternatively, the communications manager 620 may support wireless communications in accordance with examples as disclosed herein. The message reception manager 640 is capable of, configured to, or operable to support a means for receiving a message including a mapped set of encoded information symbols. The demodulation manager 645 is capable of, configured to, or operable to support a means for performing a demapping procedure on the mapped set of encoded information symbols, where the demapping procedure demaps the mapped set of encoded information symbols to obtain a set of encoded information symbols, a respective encoded information symbol of the set of encoded information symbols including at least two encoded information bits. The decoding manager 650 is capable of, configured to, or operable to support a means for inputting one or more encoded information symbols of the set of encoded information symbols into one or more respective channels of a polar decoder to obtain a set of information symbols, where a respective information symbol of the set of information symbols obtained from the polar decoder includes two information bits.

Figure 7:
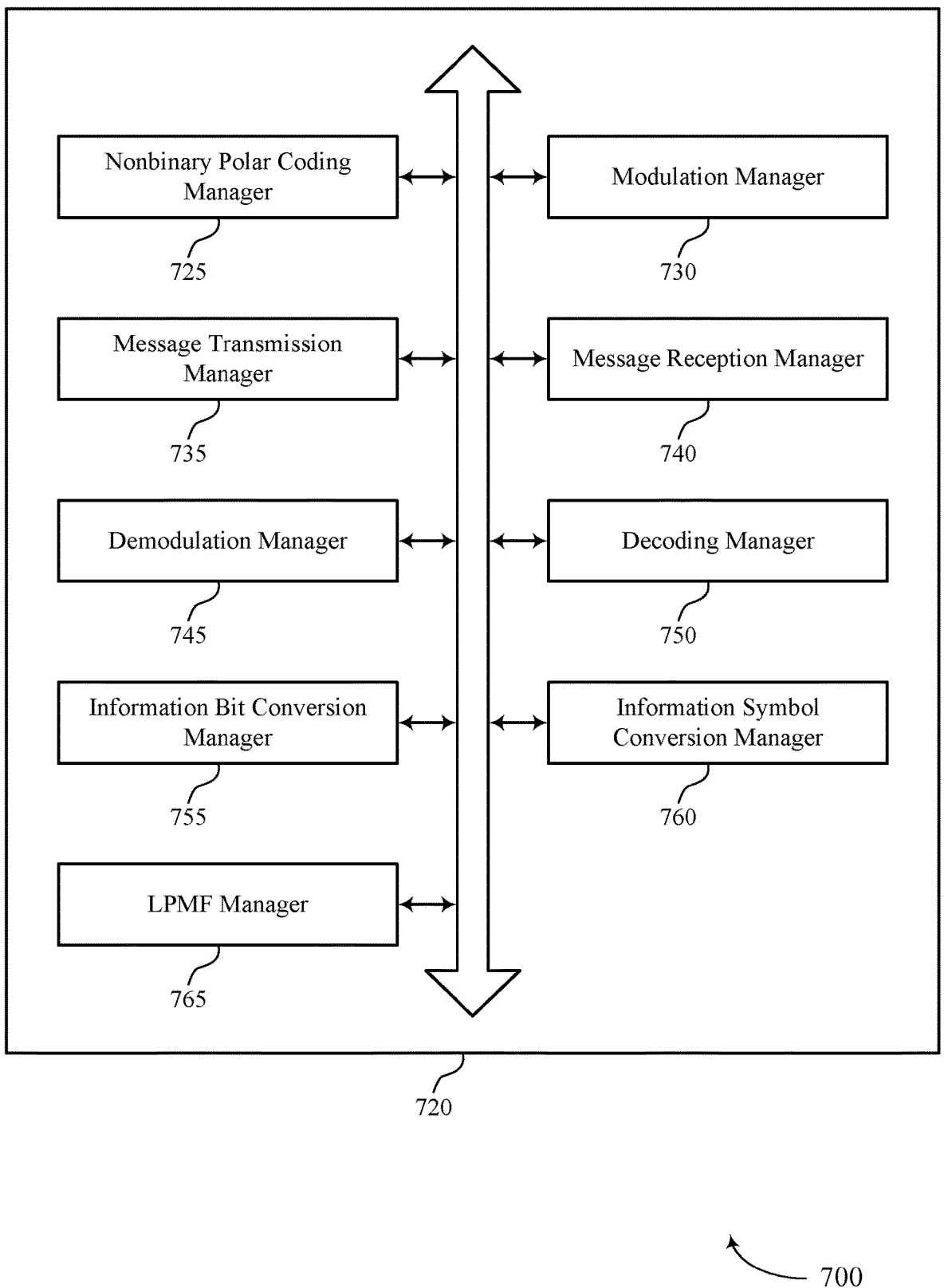
FIG. 7 shows a block diagram of a communications manager that supports modulation schemes for nonbinary polar coding in accordance with one or more aspects of the present disclosure.

FIG. 7 shows a block diagram 700 of a communications manager 720 that supports modulation schemes for nonbinary polar coding in accordance with one or more aspects of the present disclosure. The communications manager 720 may be an example of aspects of a communications manager 520, a communications manager 620, or both, as described herein. The communications manager 720, or various components thereof, may be an example of means for performing various aspects of modulation schemes for nonbinary polar coding as described herein. For example, the communications manager 720 may include a nonbinary polar coding manager 725, a modulation manager 730, a message transmission manager 735, a message reception manager 740, a demodulation manager 745, a decoding manager 750, an information bit conversion manager 755, an information symbol conversion manager 760, an LPMF manager 765, or any combination thereof. Each of these components, or components or subcomponents thereof (e.g., one or more processors, one or more memories), may communicate, directly or indirectly, with one another (e.g., via one or more buses).

The communications manager 720 may support wireless communications in accordance with examples as disclosed herein. The nonbinary polar coding manager 725 is capable of, configured to, or operable to support a means for inputting one or more information symbols of a set of information symbols into one or more respective channels of a polar encoder to obtain a set of encoded information symbols, where a respective information symbol input into a respective channel includes at least two information bits, and where a respective encoded information symbol obtained from the polar encoder includes at least two encoded information bits. The modulation manager 730 is capable of, configured to, or operable to support a means for performing a mapping procedure on the set of encoded information symbols, where the mapping procedure maps the set of encoded information symbols to one or more constellation points associated with a modulation scheme for transmission of the set of encoded information symbols to obtain a mapped set of encoded information symbols. The message transmission manager 735 is capable of, configured to, or operable to support a means for transmitting a message including the mapped set of encoded information symbols.

In some examples, to support performing the mapping procedure, the modulation manager 730 is capable of, configured to, or operable to support a means for inputting each encoded information symbol of the set of encoded information symbols into a mapping function to map each encoded information symbol to a respective constellation point of the one or more constellation points.

In some examples, the mapping function is a symbol-level gray labeling function.

In some examples, to support performing the mapping procedure, the modulation manager 730 is capable of, configured to, or operable to support a means for mapping a first encoded information symbol of the set of encoded information symbols to a set of most significant bits of a first constellation point of the one or more constellation points. In some examples, to support performing the mapping procedure, the modulation manager 730 is capable of, configured to, or operable to support a means for mapping a second encoded information symbol of the set of encoded information symbols to a set of least significant bits of the first constellation point.

In some examples, to support performing the mapping procedure, the information bit conversion manager 755 is capable of, configured to, or operable to support a means for converting the set of encoded information symbols into a string of encoded information bits. In some examples, to support performing the mapping procedure, the modulation manager 730 is capable of, configured to, or operable to support a means for inputting each encoded information bit of the string of encoded information bits into a mapping function to map each encoded information bit to a respective constellation point of the one or more constellation points.

In some examples, to support performing the mapping procedure, the modulation manager 730 is capable of, configured to, or operable to support a means for mapping a first set of multiple bits of the string of encoded information bits to a first constellation point of the one or more constellation points. In some examples, to support performing the mapping procedure, the modulation manager 730 is capable of, configured to, or operable to support a means for mapping a second set of multiple bits of the string of encoded information bits to a second constellation point of the one or more constellation points.

In some examples, one or more reliability levels associated with the mapped set of encoded information symbols are below a threshold reliability.

In some examples, the mapping function is a bit-level gray labeling function.

In some examples, to support inputting the one or more information symbols into the one or more respective channels of the polar encoder, the nonbinary polar coding manager 725 is capable of, configured to, or operable to support a means for inputting each respective one of the set of information symbols into a respective channel of the polar encoder.

In some examples, the modulation manager 730 is capable of, configured to, or operable to support a means for selecting a mapping function associated with the mapping procedure based on a gain associated with the mapping function, an error rate associated with the mapping function, a signal-to-noise ratio associated with a wireless channel, or any combination thereof.

Additionally, or alternatively, the communications manager 720 may support wireless communications in accordance with examples as disclosed herein. The message reception manager 740 is capable of, configured to, or operable to support a means for receiving a message including a mapped set of encoded information symbols. The demodulation manager 745 is capable of, configured to, or operable to support a means for performing a demapping procedure on the mapped set of encoded information symbols, where the demapping procedure demaps the mapped set of encoded information symbols to obtain a set of encoded information symbols, a respective encoded information symbol of the set of encoded information symbols including at least two encoded information bits. The decoding manager 750 is capable of, configured to, or operable to support a means for inputting one or more encoded information symbols of the set of encoded information symbols into one or more respective channels of a polar decoder to obtain a set of information symbols, where a respective information symbol of the set of information symbols obtained from the polar decoder includes two information bits.

In some examples, to support performing the demapping procedure, the demodulation manager 745 is capable of, configured to, or operable to support a means for inputting each mapped encoded information symbol of the mapped set of encoded information symbols into a demapping function to demap each mapped encoded information symbol of the mapped set of encoded information symbols from a respective constellation point of one or more constellation points.

In some examples, to support performing the demapping procedure, the demodulation manager 745 is capable of, configured to, or operable to support a means for inputting each of the mapped set of encoded information symbols into a demapping function to obtain one or more strings of encoded information bits associated with the mapped set of encoded information bits. In some examples, to support performing the demapping procedure, the information symbol conversion manager 760 is capable of, configured to, or operable to support a means for converting the one or more strings of encoded information bits into the set of encoded information symbols.

In some examples, to support performing the demapping procedure, the demodulation manager 745 is capable of, configured to, or operable to support a means for inputting each of the mapped set of encoded information symbols into a symbol-level max-log-map demapper.

In some examples, the LPMF manager 765 is capable of, configured to, or operable to support a means for obtaining a respective logarithmic probability mass function associated with each of the set of information symbols.

In some examples, each respective logarithmic probability mass function is based on a set of multiple probabilities associated with possible values of a respective one of the set of information symbols.

In some examples, to support inputting the one or more encoded information symbols into the one or more respective channels of the polar decoder, the decoding manager 750 is capable of, configured to, or operable to support a means for inputting each respective one of the set of encoded information symbols into a respective channel of the polar decoder.

Figure 8:
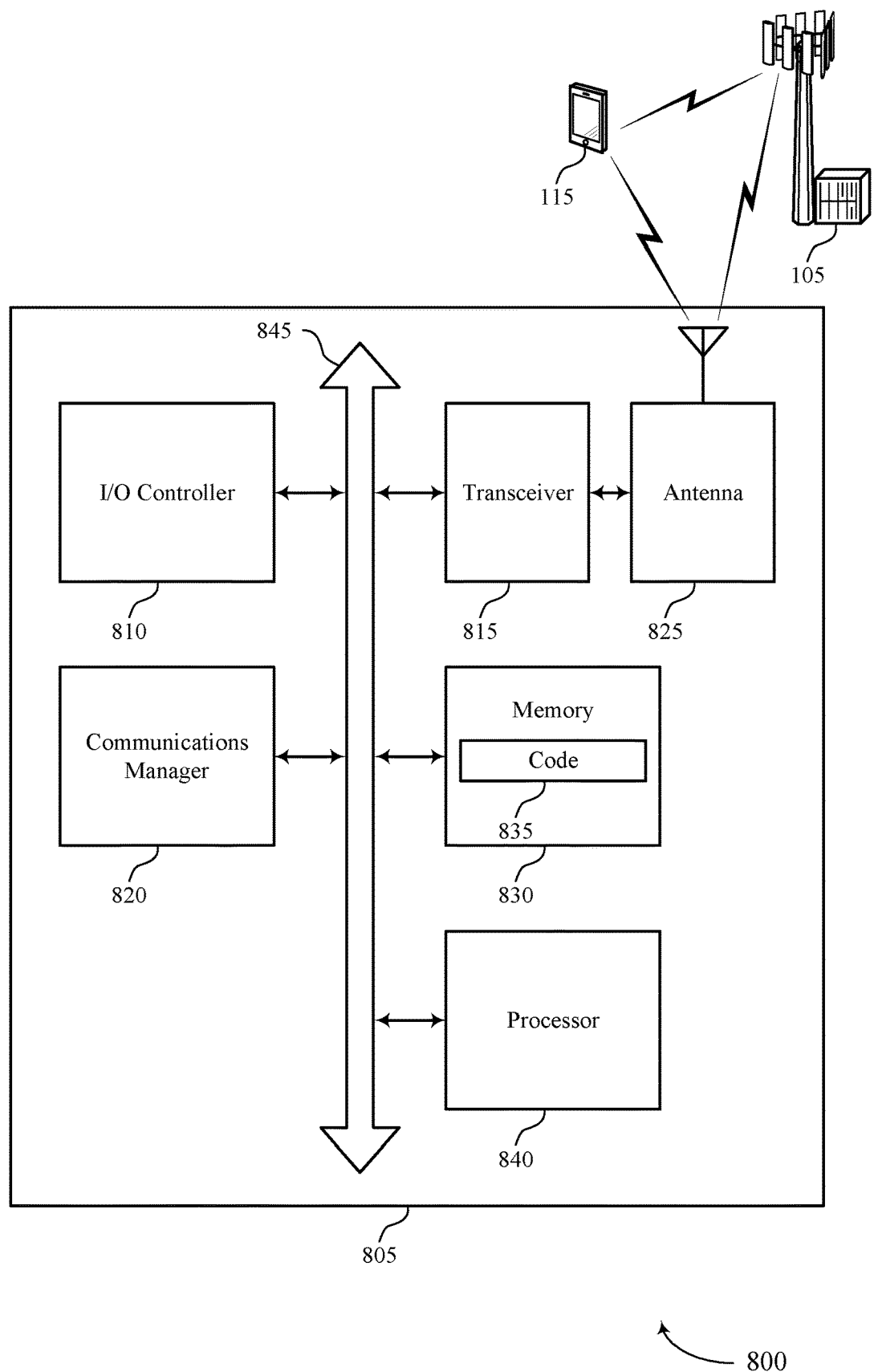
FIG. 8 shows a diagram of a system including a device that supports modulation schemes for nonbinary polar coding in accordance with one or more aspects of the present disclosure.

FIG. 8 shows a diagram of a system 800 including a device 805 that supports modulation schemes for nonbinary polar coding in accordance with one or more aspects of the present disclosure. The device 805 may be an example of or include components of a device 505, a device 605, or a UE 115 as described herein. The device 805 may communicate (e.g., wirelessly) with one or more other devices (e.g., network entities 105, UEs 115, or a combination thereof). The device 805 may include components for bi-directional voice and data communications including components for transmitting and receiving communications, such as a communications manager 820, an input/output (I/O) controller, such as an I/O controller 810, a transceiver 815, one or more antennas 825, at least one memory 830, code 835, and at least one processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of one or more processors, such as the at least one processor 840. In some cases, a user may interact with the device 805 via the I/O controller 810 or via hardware components controlled by the I/O controller 810.

In some cases, the device 805 may include a single antenna. However, in some other cases, the device 805 may have more than one antenna, which may be capable of concurrently transmitting or receiving multiple wireless transmissions. The transceiver 815 may communicate bi-directionally via the one or more antennas 825 using wired or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The at least one memory 830 may include random access memory (RAM) and read-only memory (ROM). The at least one memory 830 may store computer-readable, computer-executable, or processor-executable code, such as the code 835. The code 835 may include instructions that, when executed by the at least one processor 840, cause the device 805 to perform various functions described herein. The code 835 may be stored in a non-transitory computer-readable medium such as system memory or another type of memory. In some cases, the code 835 may not be directly executable by the at least one processor 840 but may cause a computer (e.g., when compiled and executed) to perform functions described herein. In some cases, the at least one memory 830 may include, among other things, a basic I/O system (BIOS) which may control basic hardware or software operation such as the interaction with peripheral components or devices.

The at least one processor 840 may include one or more intelligent hardware devices (e.g., one or more general-purpose processors, one or more DSPs, one or more central processing units (CPUs), one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 840 may be configured to operate a memory array using a memory controller. In some other cases, a memory controller may be integrated into the at least one processor 840. The at least one processor 840 may be configured to execute computer-readable instructions stored in a memory (e.g., the at least one memory 830) to cause the device 805 to perform various functions (e.g., functions or tasks supporting modulation schemes for nonbinary polar coding). For example, the device 805 or a component of the device 805 may include at least one processor 840 and at least one memory 830 coupled with or to the at least one processor 840, the at least one processor 840 and the at least one memory 830 configured to perform various functions described herein. In some examples, the at least one processor 840 may include multiple processors and the at least one memory 830 may include multiple memories. One or more of the multiple processors may be coupled with one or more of the multiple memories, which may, individually or collectively, be configured to perform various functions described herein. In some examples, the at least one processor 840 may be a component of a processing system, which may refer to a system (such as a series) of machines, circuitry (including, for example, one or both of processor circuitry (which may include the at least one processor 840) and memory circuitry (which may include the at least one memory 830)), or components, that receives or obtains inputs and processes the inputs to produce, generate, or obtain a set of outputs. The processing system may be configured to perform one or more of the functions described herein. For example, the at least one processor 840 or a processing system including the at least one processor 840 may be configured to, configurable to, or operable to cause the device 805 to perform one or more of the functions described herein. Further, as described herein, being "configured to," being "configurable to," and being "operable to" may be used interchangeably and may be associated with a capability, when executing code 835 (e.g., processor-executable code) stored in the at least one memory 830 or otherwise, to perform one or more of the functions described herein.

The communications manager 820 may support wireless communications in accordance with examples as disclosed herein. For example, the communications manager 820 is capable of, configured to, or operable to support a means for inputting one or more information symbols of a set of information symbols into one or more respective channels of a polar encoder to obtain a set of encoded information symbols, where a respective information symbol input into a respective channel includes at least two information bits, and where a respective encoded information symbol obtained from the polar encoder includes at least two encoded information bits. The communications manager 820 is capable of, configured to, or operable to support a means for performing a mapping procedure on the set of encoded information symbols, where the mapping procedure maps the set of encoded information symbols to one or more constellation points associated with a modulation scheme for transmission of the set of encoded information symbols to obtain a mapped set of encoded information symbols. The communications manager 820 is capable of, configured to, or operable to support a means for transmitting a message including the mapped set of encoded information symbols.

Additionally, or alternatively, the communications manager 820 may support wireless communications in accordance with examples as disclosed herein. For example, the communications manager 820 is capable of, configured to, or operable to support a means for receiving a message including a mapped set of encoded information symbols. The communications manager 820 is capable of, configured to, or operable to support a means for performing a demapping procedure on the mapped set of encoded information symbols, where the demapping procedure demaps the mapped set of encoded information symbols to obtain a set of encoded information symbols, a respective encoded information symbol of the set of encoded information symbols including at least two encoded information bits. The communications manager 820 is capable of, configured to, or operable to support a means for inputting one or more encoded information symbols of the set of encoded information symbols into one or more respective channels of a polar decoder to obtain a set of information symbols, where a respective information symbol of the set of information symbols obtained from the polar decoder includes two information bits.

By including or configuring the communications manager 820 in accordance with examples as described herein, the device 805 may support techniques for mapping and demapping symbols that are encoded using a nonbinary polar coding scheme, which may allow for improved communication reliability and reduced latency.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the at least one processor 840, the at least one memory 830, the code 835, or any combination thereof. For example, the code 835 may include instructions executable by the at least one processor 840 to cause the device 805 to perform various aspects of modulation schemes for nonbinary polar coding as described herein, or the at least one processor 840 and the at least one memory 830 may be otherwise configured to, individually or collectively, perform or support such operations.

Figure 9:
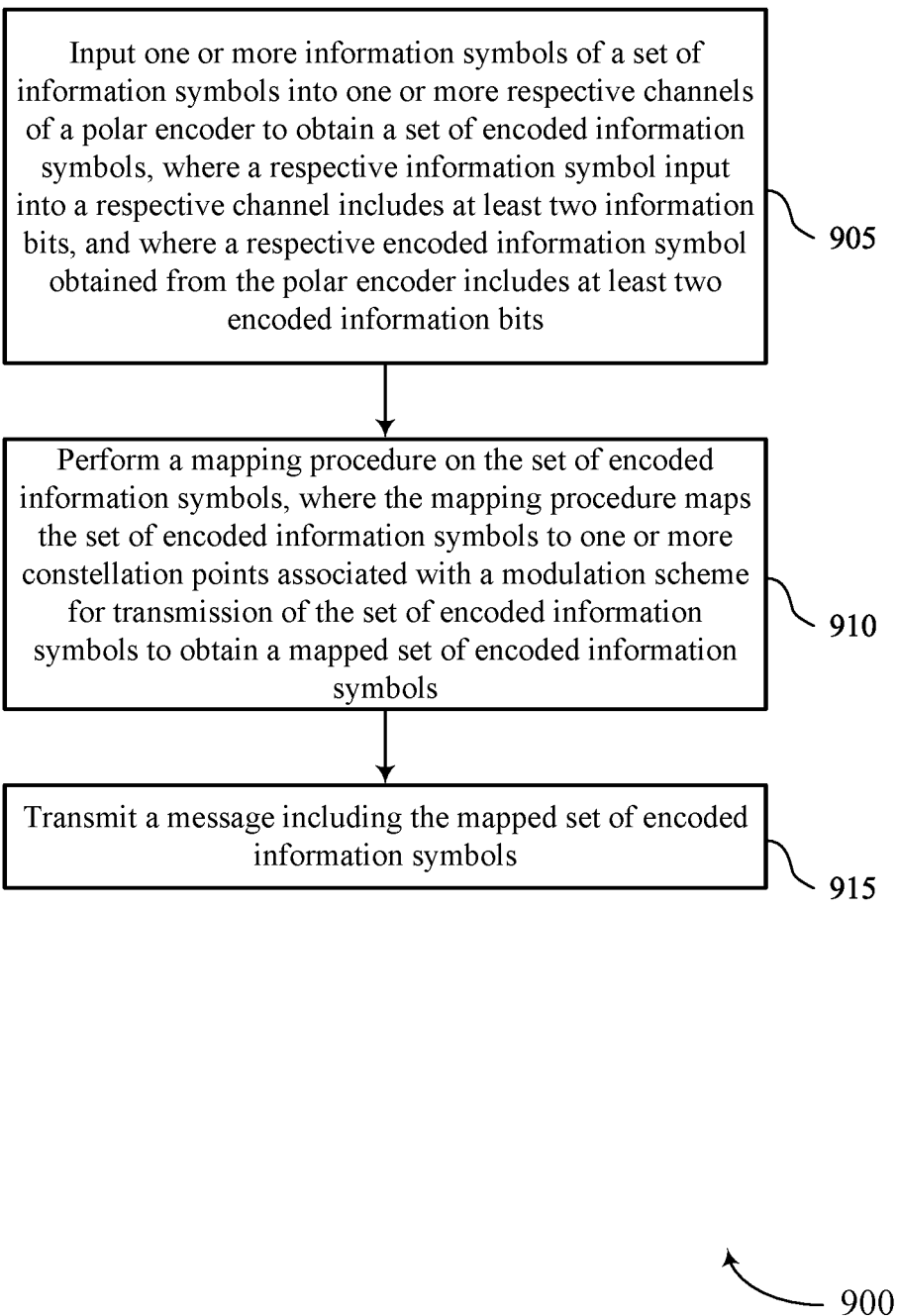
FIGS. 9 through 14 show flowcharts illustrating methods that support modulation schemes for nonbinary polar coding in accordance with one or more aspects of the present disclosure.

FIG. 9 shows a flowchart illustrating a method 900 that supports modulation schemes for nonbinary polar coding in accordance with one or more aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 905, the method may include inputting one or more information symbols of a set of information symbols into one or more respective channels of a polar encoder to obtain a set of encoded information symbols, where a respective information symbol input into a respective channel includes at least two information bits, and where a respective encoded information symbol obtained from the polar encoder includes at least two encoded information bits. The operations of 905 may be performed in accordance with examples as disclosed herein. In some examples, aspects of the operations of 905 may be performed by a nonbinary polar coding manager 725 as described with reference to FIG. 7.

At 910, the method may include performing a mapping procedure on the set of encoded information symbols, where the mapping procedure maps the set of encoded information symbols to one or more constellation points associated with a modulation scheme for transmission of the set of encoded information symbols to obtain a mapped set of encoded information symbols. The operations of 910 may be performed in accordance with examples as disclosed herein. In some examples, aspects of the operations of 910 may be performed by a modulation manager 730 as described with reference to FIG. 7.

At 915, the method may include transmitting a message including the mapped set of encoded information symbols. The operations of 915 may be performed in accordance with examples as disclosed herein. In some examples, aspects of the operations of 915 may be performed by a message transmission manager 735 as described with reference to FIG. 7.

Figure 10:
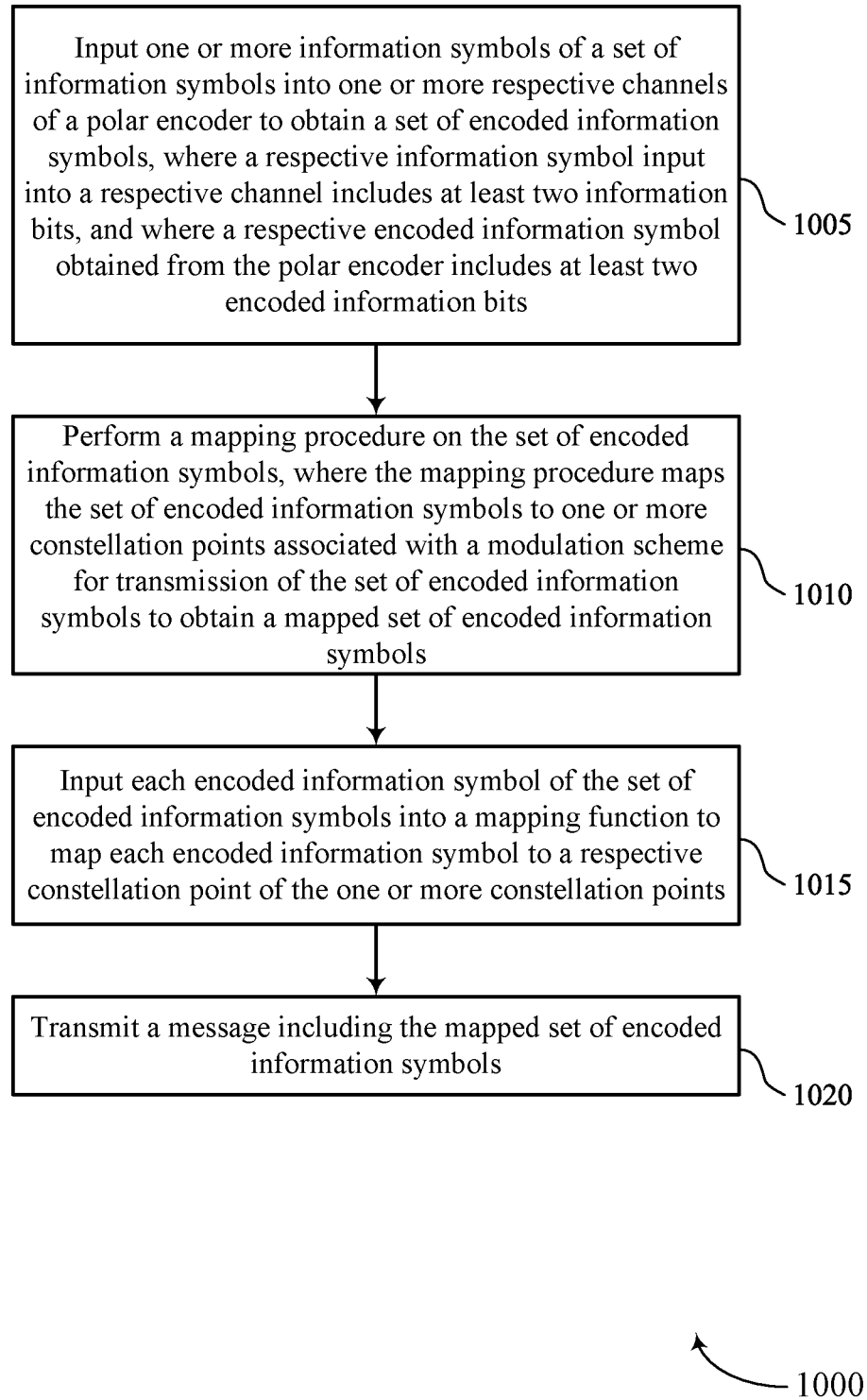

FIG. 10 shows a flowchart illustrating a method 1000 that supports modulation schemes for nonbinary polar coding in accordance with one or more aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1005, the method may include inputting one or more information symbols of a set of information symbols into one or more respective channels of a polar encoder to obtain a set of encoded information symbols, where a respective information symbol input into a respective channel includes at least two information bits, and where a respective encoded information symbol obtained from the polar encoder includes at least two encoded information bits. The operations of 1005 may be performed in accordance with examples as disclosed herein. In some examples, aspects of the operations of 1005 may be performed by a nonbinary polar coding manager 725 as described with reference to FIG. 7.

At 1010, the method may include performing a mapping procedure on the set of encoded information symbols, where the mapping procedure maps the set of encoded information symbols to one or more constellation points associated with a modulation scheme for transmission of the set of encoded information symbols to obtain a mapped set of encoded information symbols. The operations of 1010 may be performed in accordance with examples as disclosed herein. In some examples, aspects of the operations of 1010 may be performed by a modulation manager 730 as described with reference to FIG. 7.

At 1015, the method may include inputting each encoded information symbol of the set of encoded information symbols into a mapping function to map each encoded information symbol to a respective constellation point of the one or more constellation points. The operations of 1015 may be performed in accordance with examples as disclosed herein. In some examples, aspects of the operations of 1015 may be performed by a modulation manager 730 as described with reference to FIG. 7.

At 1020, the method may include transmitting a message including the mapped set of encoded information symbols. The operations of 1020 may be performed in accordance with examples as disclosed herein. In some examples, aspects of the operations of 1020 may be performed by a message transmission manager 735 as described with reference to FIG. 7.

Figure 11:
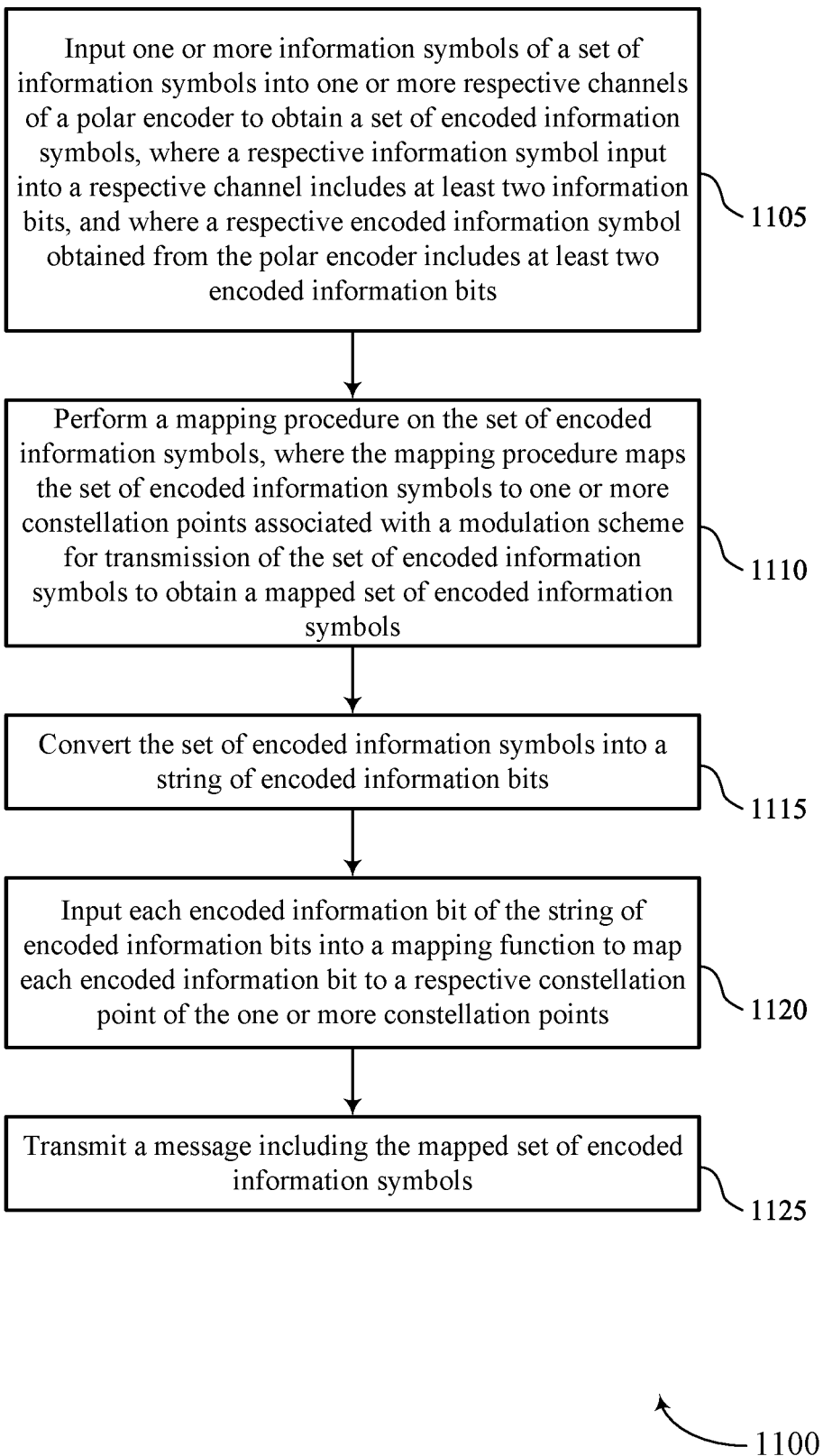

FIG. 11 shows a flowchart illustrating a method 1100 that supports modulation schemes for nonbinary polar coding in accordance with one or more aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1105, the method may include inputting one or more information symbols of a set of information symbols into one or more respective channels of a polar encoder to obtain a set of encoded information symbols, where a respective information symbol input into a respective channel includes at least two information bits, and where a respective encoded information symbol obtained from the polar encoder includes at least two encoded information bits. The operations of 1105 may be performed in accordance with examples as disclosed herein. In some examples, aspects of the operations of 1105 may be performed by a nonbinary polar coding manager 725 as described with reference to FIG. 7.

At 1110, the method may include performing a mapping procedure on the set of encoded information symbols, where the mapping procedure maps the set of encoded information symbols to one or more constellation points associated with a modulation scheme for transmission of the set of encoded information symbols to obtain a mapped set of encoded information symbols. The operations of 1110 may be performed in accordance with examples as disclosed herein. In some examples, aspects of the operations of 1110 may be performed by a modulation manager 730 as described with reference to FIG. 7.

At 1115, the method may include converting the set of encoded information symbols into a string of encoded information bits. The operations of 1115 may be performed in accordance with examples as disclosed herein. In some examples, aspects of the operations of 1115 may be performed by an information bit conversion manager 755 as described with reference to FIG. 7.

At 1120, the method may include inputting each encoded information bit of the string of encoded information bits into a mapping function to map each encoded information bit to a respective constellation point of the one or more constellation points. The operations of 1120 may be performed in accordance with examples as disclosed herein. In some examples, aspects of the operations of 1120 may be performed by a modulation manager 730 as described with reference to FIG. 7.

At 1125, the method may include transmitting a message including the mapped set of encoded information symbols. The operations of 1125 may be performed in accordance with examples as disclosed herein. In some examples, aspects of the operations of 1125 may be performed by a message transmission manager 735 as described with reference to FIG. 7.

Figure 12:
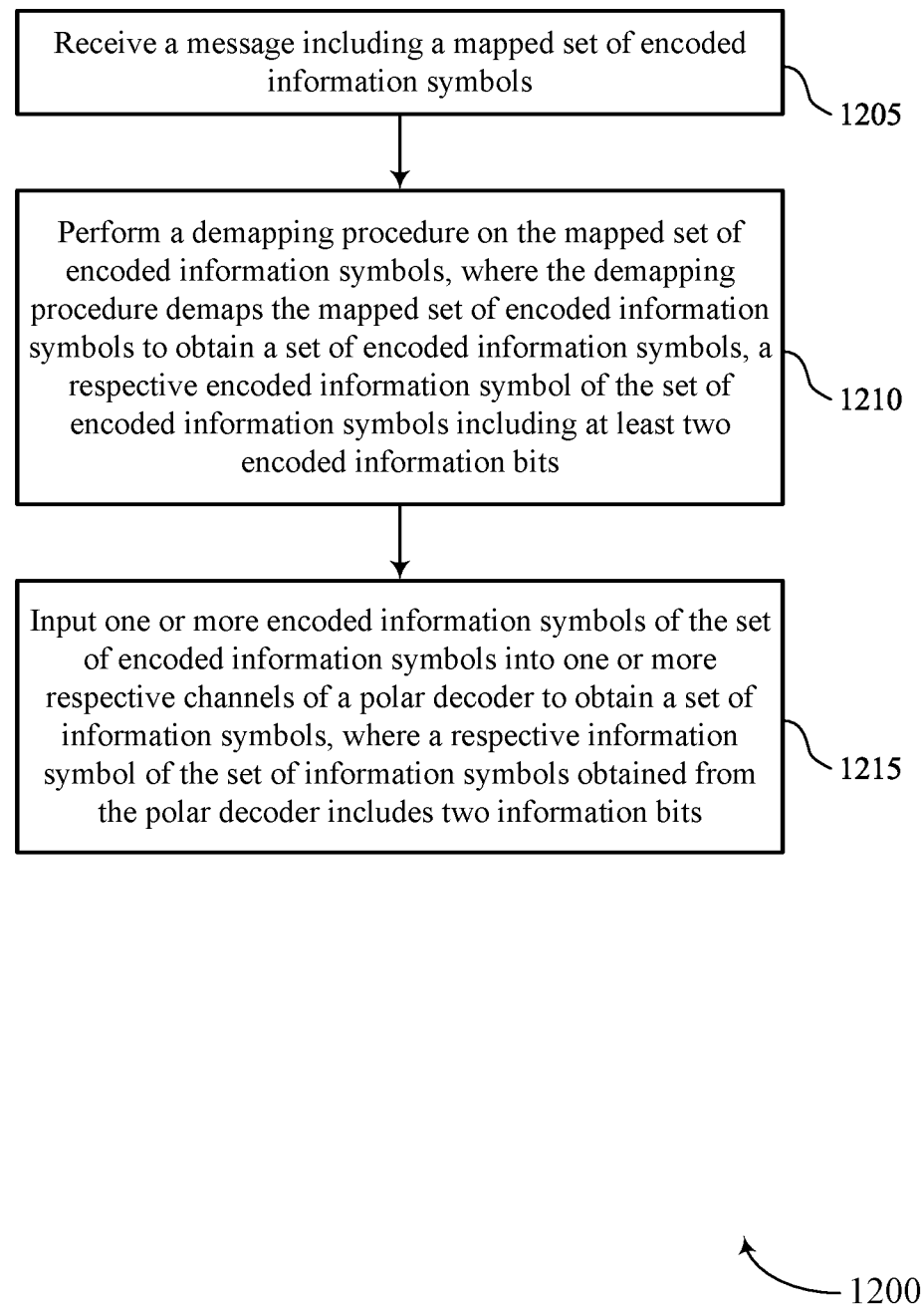

FIG. 12 shows a flowchart illustrating a method 1200 that supports modulation schemes for nonbinary polar coding in accordance with one or more aspects of the present disclosure. The operations of the method 1200 may be implemented by a UE or its components as described herein. For example, the operations of the method 1200 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1205, the method may include receiving a message including a mapped set of encoded information symbols. The operations of 1205 may be performed in accordance with examples as disclosed herein. In some examples, aspects of the operations of 1205 may be performed by a message reception manager 740 as described with reference to FIG. 7.

At 1210, the method may include performing a demapping procedure on the mapped set of encoded information symbols, where the demapping procedure demaps the mapped set of encoded information symbols to obtain a set of encoded information symbols, a respective encoded information symbol of the set of encoded information symbols including at least two encoded information bits. The operations of 1210 may be performed in accordance with examples as disclosed herein. In some examples, aspects of the operations of 1210 may be performed by a demodulation manager 745 as described with reference to FIG. 7.

At 1215, the method may include inputting one or more encoded information symbols of the set of encoded information symbols into one or more respective channels of a polar decoder to obtain a set of information symbols, where a respective information symbol of the set of information symbols obtained from the polar decoder includes two information bits. The operations of 1215 may be performed in accordance with examples as disclosed herein. In some examples, aspects of the operations of 1215 may be performed by a decoding manager 750 as described with reference to FIG. 7.

Figure 13:
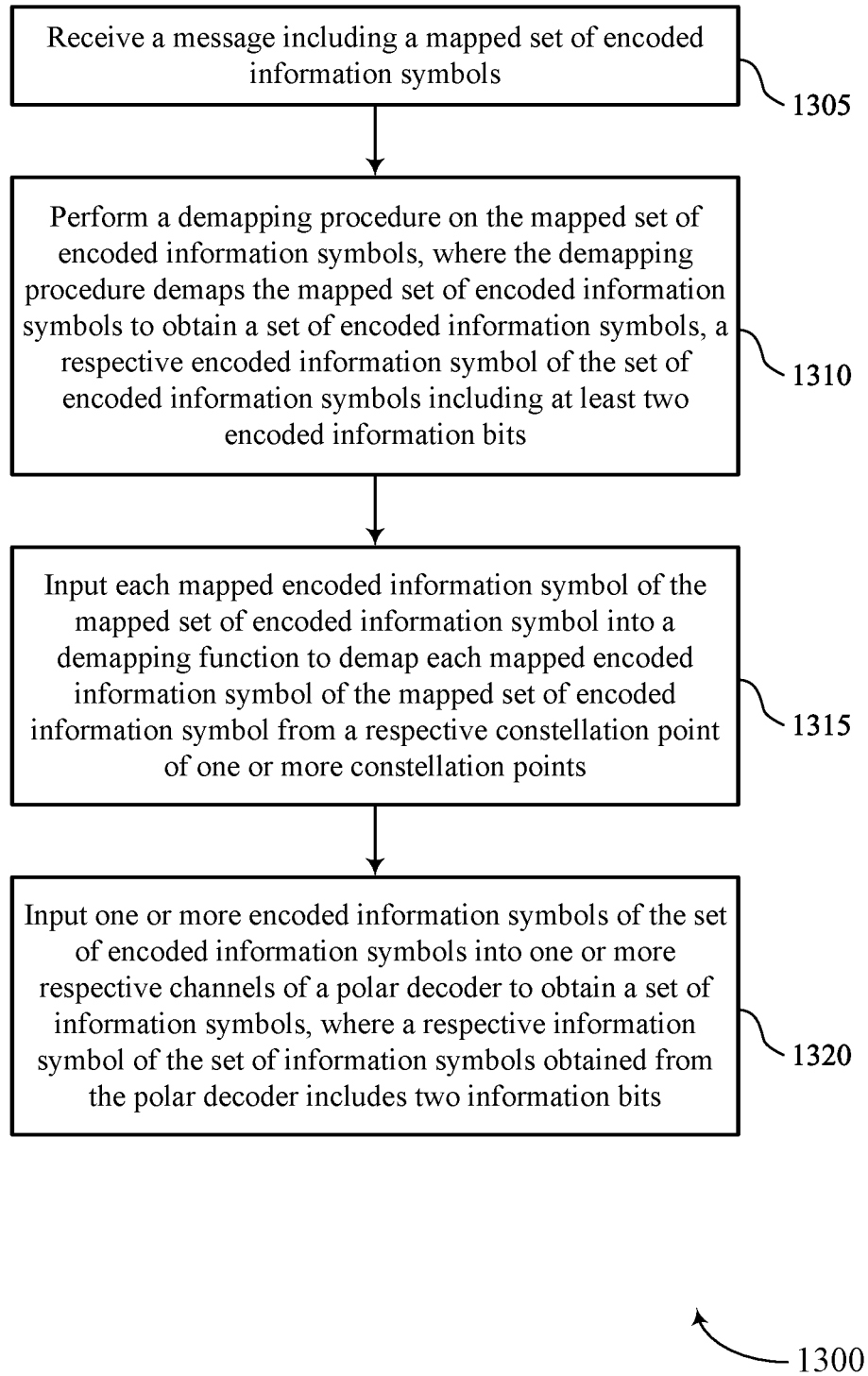

FIG. 13 shows a flowchart illustrating a method 1300 that supports modulation schemes for nonbinary polar coding in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving a message including a mapped set of encoded information symbols. The operations of 1305 may be performed in accordance with examples as disclosed herein. In some examples, aspects of the operations of 1305 may be performed by a message reception manager 740 as described with reference to FIG. 7.

At 1310, the method may include performing a demapping procedure on the mapped set of encoded information symbols, where the demapping procedure demaps the mapped set of encoded information symbols to obtain a set of encoded information symbols, a respective encoded information symbol of the set of encoded information symbols including at least two encoded information bits. The operations of 1310 may be performed in accordance with examples as disclosed herein. In some examples, aspects of the operations of 1310 may be performed by a demodulation manager 745 as described with reference to FIG. 7.

At 1315, the method may include inputting each mapped encoded information symbol of the mapped set of encoded information symbols into a demapping function to demap each mapped encoded information symbol of the mapped set of encoded information symbols from a respective constellation point of one or more constellation points. The operations of 1315 may be performed in accordance with examples as disclosed herein. In some examples, aspects of the operations of 1315 may be performed by a demodulation manager 745 as described with reference to FIG. 7.

At 1320, the method may include inputting one or more encoded information symbols of the set of encoded information symbols into one or more respective channels of a polar decoder to obtain a set of information symbols, where a respective information symbol of the set of information symbols obtained from the polar decoder includes two information bits. The operations of 1320 may be performed in accordance with examples as disclosed herein. In some examples, aspects of the operations of 1320 may be performed by a decoding manager 750 as described with reference to FIG. 7.

Figure 14:
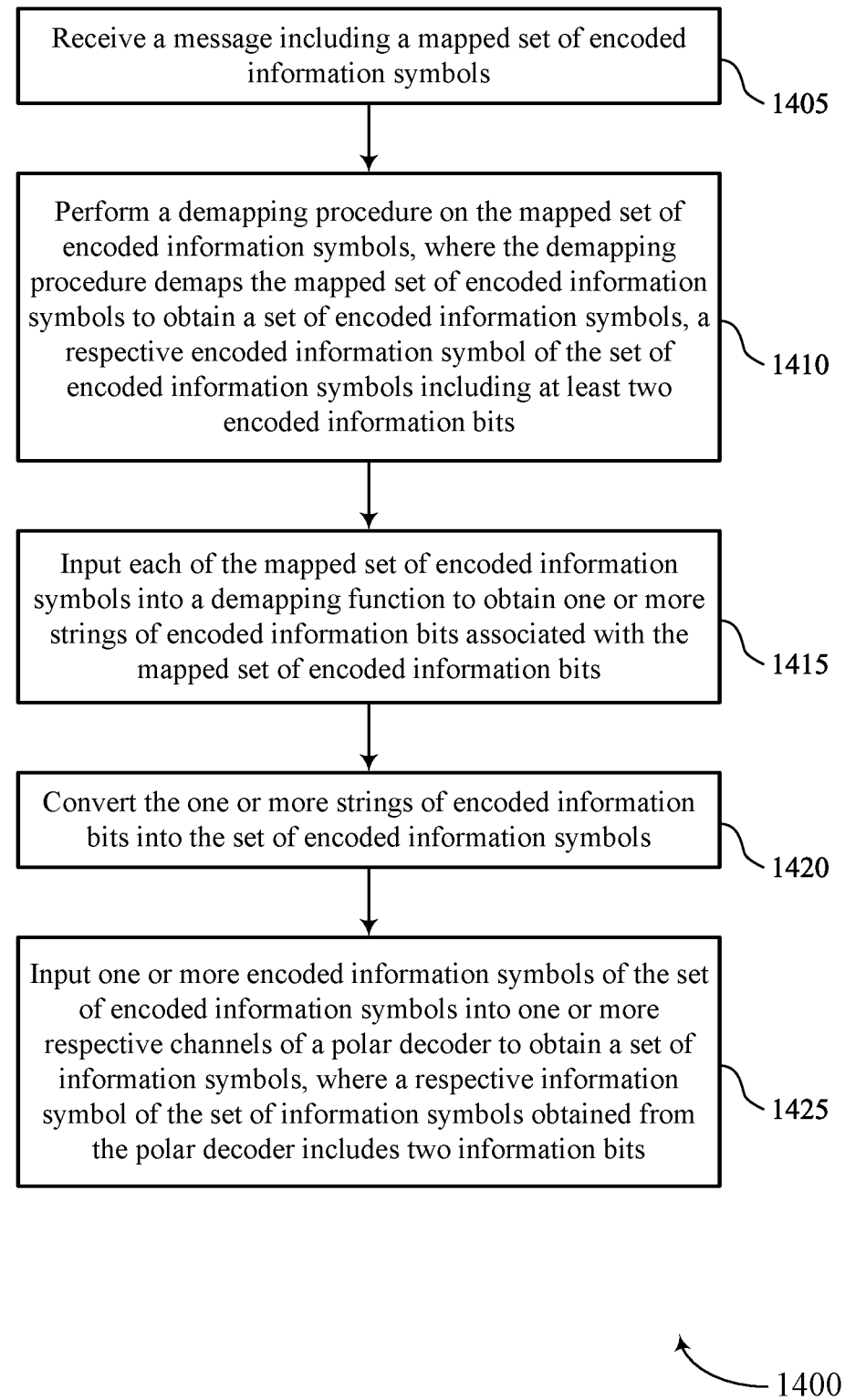

FIG. 14 shows a flowchart illustrating a method 1400 that supports modulation schemes for nonbinary polar coding in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include receiving a message including a mapped set of encoded information symbols. The operations of 1405 may be performed in accordance with examples as disclosed herein. In some examples, aspects of the operations of 1405 may be performed by a message reception manager 740 as described with reference to FIG. 7.

At 1410, the method may include performing a demapping procedure on the mapped set of encoded information symbols, where the demapping procedure demaps the mapped set of encoded information symbols to obtain a set of encoded information symbols, a respective encoded information symbol of the set of encoded information symbols including at least two encoded information bits. The operations of 1410 may be performed in accordance with examples as disclosed herein. In some examples, aspects of the operations of 1410 may be performed by a demodulation manager 745 as described with reference to FIG. 7.

At 1415, the method may include inputting each of the mapped set of encoded information symbols into a demapping function to obtain one or more strings of encoded information bits associated with the mapped set of encoded information bits. The operations of 1415 may be performed in accordance with examples as disclosed herein. In some examples, aspects of the operations of 1415 may be performed by a demodulation manager 745 as described with reference to FIG. 7.

At 1420, the method may include converting the one or more strings of encoded information bits into the set of encoded information symbols. The operations of 1420 may be performed in accordance with examples as disclosed herein. In some examples, aspects of the operations of 1420 may be performed by an information symbol conversion manager 760 as described with reference to FIG. 7.

At 1425, the method may include inputting one or more encoded information symbols of the set of encoded information symbols into one or more respective channels of a polar decoder to obtain a set of information symbols, where a respective information symbol of the set of information symbols obtained from the polar decoder includes two information bits. The operations of 1425 may be performed in accordance with examples as disclosed herein. In some examples, aspects of the operations of 1425 may be performed by a decoding manager 750 as described with reference to FIG. 7.

The following provides an overview of aspects of the present disclosure:

Aspect 1: A method for wireless communications by a wireless device, comprising: inputting one or more information symbols of a set of information symbols into one or more respective channels of a polar encoder to obtain a set of encoded information symbols, wherein a respective information symbol input into a respective channel comprises at least two information bits, and wherein a respective encoded information symbol obtained from the polar encoder comprises at least two encoded information bits; performing a mapping procedure on the set of encoded information symbols, wherein the mapping procedure maps the set of encoded information symbols to one or more constellation points associated with a modulation scheme for transmission of the set of encoded information symbols to obtain a mapped set of encoded information symbols; and transmitting a message comprising the mapped set of encoded information symbols.

Aspect 2: The method of aspect 1, wherein performing the mapping procedure comprises: inputting each encoded information symbol of the set of encoded information symbols into a mapping function to map each encoded information symbol to a respective constellation point of the one or more constellation points.

Aspect 3: The method of aspect 2, wherein the mapping function is a symbol-level gray labeling function.

Aspect 4: The method of aspect 2, wherein performing the mapping procedure comprises: mapping a first encoded information symbol of the set of encoded information symbols to a set of most significant bits of a first constellation point of the one or more constellation points; and mapping a second encoded information symbol of the set of encoded information symbols to a set of least significant bits of the first constellation point.

Aspect 5: The method of aspect 1, wherein performing the mapping procedure comprises: converting the set of encoded information symbols into a string of encoded information bits; and inputting each encoded information bit of the string of encoded information bits into a mapping function to map each encoded information bit to a respective constellation point of the one or more constellation points.

Aspect 6: The method of aspect 5, wherein performing the mapping procedure comprises: mapping a first plurality of bits of the string of encoded information bits to a first constellation point of the one or more constellation points; and mapping a second plurality of bits of the string of encoded information bits to a second constellation point of the one or more constellation points.

Aspect 7: The method of any of aspects 5 through 6, wherein one or more reliability levels associated with the mapped set of encoded information symbols are below a threshold reliability.

Aspect 8: The method of any of aspects 5 through 7, wherein the mapping function is a bit-level gray labeling function.

Aspect 9: The method of any of aspects 1 through 8, wherein inputting the one or more information symbols into the one or more respective channels of the polar encoder comprises: inputting each respective one of the set of information symbols into a respective channel of the polar encoder.

Aspect 10: The method of any of aspects 1 through 9, further comprising: selecting a mapping function associated with the mapping procedure based at least in part on a gain associated with the mapping function, an error rate associated with the mapping function, a signal-to-noise ratio associated with a wireless channel, or any combination thereof.

Aspect 11: A method for wireless communications at a wireless device, comprising: receiving a message comprising a mapped set of encoded information symbols; performing a demapping procedure on the mapped set of encoded information symbols, wherein the demapping procedure demaps the mapped set of encoded information symbols to obtain a set of encoded information symbols, a respective encoded information symbol of the set of encoded information symbols comprising at least two encoded information bits; and inputting one or more encoded information symbols of the set of encoded information symbols into one or more respective channels of a polar decoder to obtain a set of information symbols, wherein a respective information symbol of the set of information symbols obtained from the polar decoder comprises two information bits.

Aspect 12: The method of aspect 11, wherein performing the demapping procedure comprises: inputting each mapped encoded information symbol of the mapped set of encoded information symbol into a demapping function to demap each mapped encoded information symbol of the mapped set of encoded information symbol from a respective constellation point of one or more constellation points.

Aspect 13: The method of aspect 11, wherein performing the demapping procedure comprises: inputting each of the mapped set of encoded information symbols into a demapping function to obtain one or more strings of encoded information bits associated with the mapped set of encoded information bits; and converting the one or more strings of encoded information bits into the set of encoded information symbols.

Aspect 14: The method of any of aspects 11 through 13, wherein performing the demapping procedure comprises: inputting each of the mapped set of encoded information symbols into a symbol-level max-log-map demapper.

Aspect 15: The method of any of aspects 11 through 14, further comprising: obtaining a respective logarithmic probability mass function associated with each of the set of information symbols.

Aspect 16: The method of aspect 15, wherein each respective logarithmic probability mass function is based at least in part on a plurality of probabilities associated with possible values of a respective one of the set of information symbols.

Aspect 17: The method of any of aspects 11 through 16, wherein inputting the one or more encoded information symbols into the one or more respective channels of the polar decoder comprises: inputting each respective one of the set of encoded information symbols into a respective channel of the polar decoder.

Aspect 18: A wireless device for wireless communications, comprising one or more memories storing processor-executable code, and one or more processors coupled with the one or more memories and individually or collectively operable to execute the code to cause the wireless device to perform a method of any of aspects 1 through 10.

Aspect 19: A wireless device for wireless communications, comprising at least one means for performing a method of any of aspects 1 through 10.

Aspect 20: A non-transitory computer-readable medium storing code for wireless communications, the code comprising instructions executable by one or more processors to perform a method of any of aspects 1 through 10.

Aspect 21: A wireless device for wireless communications, comprising one or more memories storing processor-executable code, and one or more processors coupled with the one or more memories and individually or collectively operable to execute the code to cause the wireless device to perform a method of any of aspects 11 through 17.

Aspect 22: A wireless device for wireless communications, comprising at least one means for performing a method of any of aspects 11 through 17.

Aspect 23: A non-transitory computer-readable medium storing code for wireless communications, the code comprising instructions executable by one or more processors to perform a method of any of aspects 11 through 17.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers.

Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A wireless device, comprising:
   one or more non-transitory memories storing processor-executable code; and
   one or more processors coupled with the one or more non-transitory memories and individually or collectively operable to execute the code to cause the wireless device to:
      input one or more information symbols of a set of information symbols into one or more respective channels of a polar encoder to obtain a set of encoded information symbols, wherein a respective information symbol input into a respective channel comprises at least two information bits, and wherein a respective encoded information symbol obtained from the polar encoder comprises at least two encoded information bits;
      perform a mapping procedure on the set of encoded information symbols, wherein the mapping procedure maps the set of encoded information symbols to one or more constellation points associated with a modulation scheme for transmission of the set of encoded information symbols to obtain a mapped set of encoded information symbols; and
      transmit a message comprising the mapped set of encoded information symbols.

2. The wireless device of claim 1, wherein, to perform the mapping procedure, the one or more processors are individually or collectively operable to execute the code to cause the wireless device to:
   input each encoded information symbol of the set of encoded information symbols into a mapping function to map each encoded information symbol to a respective constellation point of the one or more constellation points.

3. The wireless device of claim 2, wherein the mapping function is a symbol-level gray labeling function.

4. The wireless device of claim 2, wherein, to perform the mapping procedure, the one or more processors are individually or collectively operable to execute the code to cause the wireless device to:
   map a first encoded information symbol of the set of encoded information symbols to a set of most significant bits of a first constellation point of the one or more constellation points; and map a second encoded information symbol of the set of encoded information symbols to a set of least significant bits of the first constellation point.

5. The wireless device of claim 1, wherein, to perform the mapping procedure, the one or more processors are individually or collectively operable to execute the code to cause the wireless device to:
convert the set of encoded information symbols into a string of encoded information bits; and
input each encoded information bit of the string of encoded information bits into a mapping function to map each encoded information bit to a respective constellation point of the one or more constellation points.

6. The wireless device of claim 5, wherein, to perform the mapping procedure, the one or more processors are individually or collectively operable to execute the code to cause the wireless device to:
map a first plurality of bits of the string of encoded information bits to a first constellation point of the one or more constellation points; and
map a second plurality of bits of the string of encoded information bits to a second constellation point of the one or more constellation points.

7. The wireless device of claim 5, wherein one or more reliability levels associated with the mapped set of encoded information symbols are below a threshold reliability.

8. The wireless device of claim 5, wherein the mapping function is a bit-level gray labeling function.

9. The wireless device of claim 1, wherein, to input the one or more information symbols into the one or more respective channels of the polar encoder, the one or more processors are individually or collectively operable to execute the code to cause the wireless device to:
input each respective one of the set of information symbols into a respective channel of the polar encoder.

10. The wireless device of claim 1, wherein the one or more processors are individually or collectively further operable to execute the code to cause the wireless device to:
select a mapping function associated with the mapping procedure based at least in part on a gain associated with the mapping function, an error rate associated with the mapping function, a signal-to-noise ratio associated with a wireless channel, or any combination thereof.

11. A wireless device, comprising:
one or more non-transitory memories storing processor-executable code; and
one or more processors coupled with the one or more non-transitory memories and individually or collectively operable to execute the code to cause the wireless device to:
receive a message comprising a mapped set of encoded information symbols;
perform a demapping procedure on the mapped set of encoded information symbols, wherein the demapping procedure demaps the mapped set of encoded information symbols to obtain a set of encoded information symbols, a respective encoded information symbol of the set of encoded information symbols comprising at least two encoded information bits; and
input one or more encoded information symbols of the set of encoded information symbols into one or more respective channels of a polar decoder to obtain a set of information symbols, wherein a respective information symbol of the set of information symbols obtained from the polar decoder comprises two information bits.

12. The wireless device of claim 11, wherein, to perform the demapping procedure, the one or more processors are individually or collectively operable to execute the code to cause the wireless device to:
input each mapped encoded information symbol of the mapped set of encoded information symbols into a demapping function to demap each mapped encoded information symbol of the mapped set of encoded information symbols from a respective constellation point of one or more constellation points.

13. The wireless device of claim 11, wherein, to perform the demapping procedure, the one or more processors are individually or collectively operable to execute the code to cause the wireless device to:
input each of the mapped set of encoded information symbols into a demapping function to obtain one or more strings of encoded information bits associated with the mapped set of encoded information symbols; and
convert the one or more strings of encoded information bits into the set of encoded information symbols.

14. The wireless device of claim 11, wherein, to perform the demapping procedure, the one or more processors are individually or collectively operable to execute the code to cause the wireless device to:
input each of the mapped set of encoded information symbols into a symbol-level max-log-map demapper.

15. The wireless device of claim 11, wherein the one or more processors are individually or collectively further operable to execute the code to cause the wireless device to:
obtain a respective logarithmic probability mass function associated with each of the set of information symbols.

16. The wireless device of claim 15, wherein each respective logarithmic probability mass function is based at least in part on a plurality of probabilities associated with possible values of a respective one of the set of information symbols.

17. The wireless device of claim 11, wherein, to input the one or more encoded information symbols into the one or more respective channels of the polar decoder, the one or more processors are individually or collectively operable to execute the code to cause the wireless device to:
input each respective one of the set of encoded information symbols into a respective channel of the polar decoder.

18. A method for wireless communications by a wireless device, comprising:
inputting one or more information symbols of a set of information symbols into one or more respective channels of a polar encoder to obtain a set of encoded information symbols, wherein a respective information symbol input into a respective channel comprises at least two information bits, and wherein a respective encoded information symbol obtained from the polar encoder comprises at least two encoded information bits;
performing a mapping procedure on the set of encoded information symbols, wherein the mapping procedure maps the set of encoded information symbols to one or more constellation points associated with a modulation scheme for transmission of the set of encoded information symbols to obtain a mapped set of encoded information symbols; and
transmitting a message comprising the mapped set of encoded information symbols.

19. The method of claim 18, wherein performing the mapping procedure comprises:
   inputting each encoded information symbol of the set of encoded information symbols into a mapping function to map each encoded information symbol to a respective constellation point of the one or more constellation points.

20. The method of claim 18, wherein performing the mapping procedure comprises:
   converting the set of encoded information symbols into a string of encoded information bits; and
   inputting each encoded information bit of the string of encoded information bits into a mapping function to map each encoded information bit to a respective constellation point of the one or more constellation points.

* * * * *